United States Patent
Zhang et al.

(10) Patent No.: US 11,844,053 B2
(45) Date of Patent: Dec. 12, 2023

(54) CHANNEL QUALITY INFORMATION DETERMINING METHOD, APPARATUS, AND SYSTEM

(71) Applicant: Huawei Technologies Co., Ltd., Guangdong (CN)

(72) Inventors: Peng Zhang, Shanghai (CN); Fan Wang, Berkshire (GB); David Gregoratti, Barcelona (ES); Xavier Mestre, Barcelona (ES)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 433 days.

(21) Appl. No.: 17/226,485

(22) Filed: Apr. 9, 2021

(65) Prior Publication Data
US 2021/0227546 A1 Jul. 22, 2021

Related U.S. Application Data

(63) Continuation of application No. PCT/CN2019/106248, filed on Sep. 17, 2019.

(30) Foreign Application Priority Data

Oct. 12, 2018 (CN) .......................... 201811192061.7

(51) Int. Cl.
*H04W 24/08* (2009.01)
*H04W 72/0453* (2023.01)
(Continued)

(52) U.S. Cl.
CPC ....... *H04W 72/0453* (2013.01); *H04W 24/08* (2013.01); *H04W 72/0446* (2013.01); *H04W 72/542* (2023.01)

(58) Field of Classification Search
CPC ......... H04W 72/0446; H04W 72/0453; H04W 72/542; H04W 24/08; H04B 17/309; H04B 17/24
See application file for complete search history.

(56) References Cited

U.S. PATENT DOCUMENTS

| 2005/0243793 | A1  | 11/2005 | Kim et al. |
| 2008/0137573 | A1* | 6/2008  | Cave ............... H04L 1/1835 370/310 |

(Continued)

FOREIGN PATENT DOCUMENTS

| CN | 101079859 A | 11/2007 |
| CN | 100463456 C | 2/2009 |

(Continued)

OTHER PUBLICATIONS

Hussam Ahmed et al, Queue Aware Optimal Resource Allocation for the LTE Downlink With Best M Subband Feedback, IEEE Transactions on Wireless Commijnications, vol. 14, No. 9, Sep. 2015, 11 pages.

(Continued)

*Primary Examiner* — Syed Ali
(74) *Attorney, Agent, or Firm* — WOMBLE BOND DICKINSON (US) LLP

(57) ABSTRACT

The present disclosure relates to the field of communications technologies, and discloses a channel quality information determining method, an apparatus, and a system. The method may include: a terminal device obtains a configured TBS, and/or determines channel quality information of each of K segments of frequency domain resources based on the configured TBS and/or a time domain resource range. A frequency domain resource of the terminal device may be divided into N segments, where both N and K are integers greater than or equal to 1, and K is less than or equal to N. In some embodiments, the configured TBS may be fully (Continued)

considered when the channel quality information is determined, so that a network device properly may determine, based on the channel quality information, a frequency domain resource used to transmit a data packet.

18 Claims, 9 Drawing Sheets

(51) Int. Cl.
*H04W 72/0446* (2023.01)
*H04W 72/542* (2023.01)

(56) References Cited

U.S. PATENT DOCUMENTS

| | | | |
|---|---|---|---|
| 2009/0154588 A1 | 6/2009 | Chen et al. | |
| 2011/0211482 A1 | 9/2011 | Hoshino et al. | |
| 2014/0185479 A1 | 7/2014 | Lee | |
| 2016/0112163 A1* | 4/2016 | Bai | H04L 5/0057 370/252 |
| 2016/0212757 A1* | 7/2016 | Jung | H04W 72/51 |
| 2016/0219600 A1 | 7/2016 | Li et al. | |
| 2016/0242202 A1* | 8/2016 | Matin | H04L 1/20 |
| 2017/0033856 A1* | 2/2017 | Su | H04B 7/0626 |
| 2019/0334603 A1* | 10/2019 | Venugopal | H04B 7/0632 |
| 2020/0021400 A1* | 1/2020 | Cherian | H04L 5/0055 |
| 2020/0053591 A1* | 2/2020 | Prasad | H04W 28/0268 |
| 2020/0074504 A1* | 3/2020 | Cao | G06N 7/01 |
| 2020/0084759 A1* | 3/2020 | Liu | H04L 5/0092 |
| 2020/0150971 A1* | 5/2020 | Liu | G06F 9/3893 |
| 2023/0247631 A1* | 8/2023 | Hao | H04L 1/1822 370/252 |

FOREIGN PATENT DOCUMENTS

| | | |
|---|---|---|
| CN | 101388743 A | 3/2009 |
| CN | 101809919 A | 8/2010 |
| CN | 108024345 A | 5/2018 |
| WO | 2012022096 A1 | 2/2012 |

OTHER PUBLICATIONS

Cheng Ritao et al.,:"Study of NB-IoT planning objectives and planning roles",2016,total 7 pages.
3GPP TSG RAN WG1 Meeting 90bis R1-1718435,Discussion on CQI and MCS ,Ericsson,Prague, CZ, Oct. 9-13, 2017,total 7 pages.
3GPP TSG-RAN WG4 Meeting #79,R4-163588:"Cat-M1 UE-selected subband CQI reporting test",Ericsson,Nanjing, China, May 23-27, 2016,total 5 pages.
3GPP TSG—RAN5 Meeting #58,R5-130419:"Correction to 9.3.4 UE-selected subband CQI",St. Julian s, Malta, Jan. 28-Feb. 1, 2013,total 13 pages.

* cited by examiner

CHANNEL QUALITY INFORMATION DETERMINING METHOD, APPARATUS, AND SYSTEM

CROSS-REFERENCE TO RELATED APPLICATIONS

This application is a continuation of International Application No. PCT/CN2019/106248, filed on Sep. 17, 2019, which claims priority to Chinese Patent Application No. 201811192061.7, filed on Oct. 12, 2018. The disclosures of the aforementioned applications are hereby incorporated by reference in their entireties.

TECHNICAL FIELD

This application relates to the field of communications technologies, and in particular, to a channel quality information determining method, an apparatus, and a system.

BACKGROUND

In a wireless communications system, a network device may communicate with a terminal device. Specifically, the network device encodes data, for example, performs polar (polar) encoding, convolutional encoding, and low-density parity-check encoding on the data; performs modulation; and maps a bit sequence obtained after the modulation to a corresponding time-frequency resource, to send the symbols to the terminal device. Correspondingly, after receiving data sent by the network device, the terminal device performs demodulation and decoding to obtain the data.

To improve data transmission efficiency while ensuring transmission reliability, the network device needs to learn of quality of a radio channel used to transmit a signal, and determine a scheduling scheme based on the quality of the radio channel. In the current wireless communications system, quality information of the radio channel is usually obtained by transmitting a reference signal. Specifically, the network device sends the reference signal to the terminal device. The terminal device may perform, based on the reference signal, channel estimation on a frequency domain resource used by the terminal device, and report, to the network device, channel quality information obtained through the channel estimation, so that the network device can send the data based on the channel quality information. It can be learned that the channel quality information determined by the terminal device directly affects data transmission.

With continuous evolution, the wireless communications system can support a new scenario, and different requirements are imposed on data transmission. For example, a fifth generation (the fifth generation, 5G) new radio (New radio, NR) system supports an ultra-reliable low-latency communication (ultra-reliable low latency communication, URLLC) scenario, and a URLLC service requires that a data packet of a specific size be transmitted within a specified ultra-short time. Therefore, how to meet a transmission requirement in the new scenario needs to be further studied.

SUMMARY

In view of this, this application provides a channel quality information determining method and an apparatus, to help a network device properly determine, based on channel quality information, a frequency domain resource used to transmit a data packet, thereby meeting a transmission requirement and effectively improving efficiency of transmitting the data packet.

According to a first aspect, an embodiment of this application provides a channel quality information determining method, including:

A terminal device obtains a configured transport block size (TBS).

The terminal device determines channel quality information of each of K segments of frequency domain resources in N segments of frequency domain resources of the terminal device based on the TBS (sometimes referred to as, "configured TBS") and a time domain resource range, where both N and K are integers greater than or equal to 1, and K is less than or equal to N.

In this way, because the TBS is fully considered when the terminal device determines the channel quality information of each of the K segments of frequency domain resources (where for example, the TBS is used as an input for calculating the channel quality information), so that a network device properly determines, based on the channel quality information, a frequency domain resource used to transmit a data packet, thereby meeting a transmission requirement and effectively improving efficiency of transmitting the data packet.

In some embodiments, that the terminal device determines channel quality information of each of K segments of frequency domain resources in N segments of frequency domain resources of the terminal device based on the TBS and/or a time domain resource range includes:

The terminal device determines, based on the TBS and/or the time domain resource range, that an estimated data volume of each of the K segments of frequency domain resources in the time domain resource range meets a TBS requirement. The terminal device determines the channel quality information of each of the K segments of frequency domain resources.

In some embodiments, the method further includes:

The terminal device determines channel quality information of a segment of frequency domain resource other than the K segments of frequency domain resources in the N segments of frequency domain resources, and reports the channel quality information of each of the N segments of frequency domain resources to the network device.

In some embodiments, the method further includes: The terminal device reports the channel quality information of each of the K segments of frequency domain resources to the network device. In this way, the network device can properly determine, based on the channel quality information that is of each of the K segments of frequency domain resources and that is reported by the terminal device, the frequency domain resource used to transmit the data packet.

In some embodiments, the terminal device reports channel quality information of each of P segments of frequency domain resources in the K segments of frequency domain resources to the network device, where P is an integer greater than or equal to 1 and less than K. In this way, the terminal device reports the channel quality information of each of the P segments of frequency domain resources, to effectively reduce an amount of reported information, and reduce overheads of a transmission resource.

In some embodiments, the P segments of frequency domain resources are P segments of frequency domain resources that are in the K segments of frequency domain resources and whose estimated data volumes are the largest in the time domain resource range. In this way, the terminal device reports frequency domain resources whose estimated data volumes are relatively large, so that the network device sends the data packet on the frequency domain resources whose estimated data volumes are relatively large, thereby improving the efficiency of transmitting the data packet.

In some embodiments, the method further includes: The terminal device reports indication information for N to the network device.

In some embodiments, the method further includes: The terminal device receives indication information for K from the network device.

In some embodiments, the method further includes:

The terminal device determines, based on the TBS and/or the time domain resource range, that the K segments of frequency domain resources do not exist in the N segments of frequency domain resources of the terminal device, where an estimated data volume of each of the K segments of frequency domain resources in the time domain resource range meets a TB S requirement.

The terminal device reports first indication information and/or channel quality information of S segments of frequency domain resources to the network device, where the first indication information is used to indicate that a frequency domain resource used by the terminal device does not meet the TBS requirement, and the S segments of frequency domain resources are S segments of frequency domain resources that are in the N segments of frequency domain resources used by the terminal device and whose estimated data volumes are the largest in the time domain resource range, where S is an integer greater than or equal to 1, and S is less than or equal to N.

According to a second aspect, an embodiment of this application provides a channel quality information reporting method, including:

A terminal device obtains a configured transport block size TBS.

The terminal device determines channel quality information of M segments of frequency domain resources in W segments of frequency domain resources of the terminal device based on the TBS and/or a time domain resource range, where both W and M are integers greater than or equal to 1, and M is less than or equal to W.

In this way, because the TBS is fully considered when the terminal device determines the channel quality information of the M segments of frequency domain resources (where for example, the TBS is used as an input for calculating the channel quality information), so that a network device properly determines, based on the channel quality information, a frequency domain resource used to transmit a data packet, thereby meeting a transmission requirement and effectively improving efficiency of transmitting the data packet.

In some embodiments, that the terminal device determines channel quality information of M segments of frequency domain resources of the terminal device based on the TBS and/or a time domain resource range includes:

The terminal device determines, in the W segments of frequency domain resources of the terminal device based on the TBS and/or the time domain resource range, that a total estimated data volume of the M segments of frequency domain resources in the time domain resource range meets a TBS requirement.

The terminal device determines the channel quality information of the M segments of frequency domain resources.

In some embodiments, the method further includes: The terminal device reports the channel quality information of the M segments of frequency domain resources to the network device.

In some embodiments, the method further includes: The terminal device reports indication information for W and/or M to the network device.

In some embodiments, the method further includes:

The terminal device determines, based on the TBS and/or the time domain resource range, that the M segments of frequency domain resources do not exist in the W segments of frequency domain resources of the terminal device, where a total estimated data volume of the M segments of frequency domain resources meets a TBS requirement.

The terminal device reports second indication information and/or channel quality information of T segments of frequency domain resources to the network device, where the second indication information is used to indicate that a frequency domain resource used by the terminal device does not meet the TBS requirement, and the T segments of frequency domain resources are T segments of frequency domain resources that are in the W segments of frequency domain resources used by the terminal device and whose total estimated data volume is the largest in the time domain resource range, where T is an integer greater than or equal to 1, and T is less than or equal to W.

In some embodiments, the method may include one or more of the following:

The terminal device receives a power allocation algorithm that is used to determine the channel quality information and that is indicated by the network device.

The power allocation algorithm is a power allocation algorithm used by the network device, and/or a power allocation algorithm selected by the network device from power allocation algorithms reported by the terminal device.

According to a third aspect, an embodiment of this application provides a channel quality information determining method, including:

A network device configures a transport block size TBS, and sends (e.g., transmits, provides, delivers) the TBS to a terminal device, where the TBS is used to determine channel quality information of a frequency domain resource of the terminal device.

In some embodiments, that the TBS is used to determine channel quality information of a frequency domain resource of the terminal device includes: the TBS is used to determine channel quality information of each of K segments of frequency domain resources in N segments of frequency domain resources of the terminal device, where both N and K are integers greater than or equal to 1, and K is less than or equal to N.

In some embodiments, the method further includes:

The network device receives channel quality information that is of each of the N segments of frequency domain resources and that is sent by the terminal device, or the network device receives the channel quality information that is of each of the K segments of frequency domain resources and that is sent by the terminal device, or the network device receives channel quality information that is of each of P segments of frequency domain resources in the K segments of frequency domain resources and that is sent by the terminal device, where P is an integer greater than or equal to 1 and less than K.

In some embodiments, the P segments of frequency domain resources are P segments of frequency domain resources that are in the K segments of frequency domain resources and whose estimated data volumes are the largest in the time domain resource range.

In some embodiments, the method further includes: The network device receives indication information that is for N and that is reported by the terminal device.

In some embodiments, the method further includes: The network device sends indication information for K to the terminal device.

In some embodiments, that the TBS is used to determine channel quality information of a frequency domain resource of the terminal device includes: the TBS is used to determine channel quality information of M segments of frequency domain resources in W segments of frequency domain resources of the terminal device, where both W and M are integers greater than or equal to 1, and M is less than or equal to W.

In some embodiments, the method further includes: The network device receives the channel quality information that is of the M segments of frequency domain resources and that is sent by the terminal device.

In some embodiments, the method further includes: The network device receives indication information that is for W and/or M and that is reported by the terminal device.

In some embodiments, the method further includes: The network device indicates, to the terminal device, a power allocation algorithm used to determine the channel quality information, where the power allocation algorithm is a power allocation algorithm used by the network device, or a power allocation algorithm selected by the network device from power allocation algorithms reported by the terminal device.

According to a fourth aspect, an embodiment of this application provides an apparatus. The apparatus may be a network device or a terminal device, or may be a semiconductor chip disposed in a network device or a terminal device. The apparatus has a function of implementing various possible implementations of the first aspect, the second aspect, and the third aspect. The function may be implemented by hardware, and/or may be implemented by hardware executing corresponding software. The hardware and/or software includes one or more units or modules corresponding to the foregoing function.

According to a fifth aspect, an embodiment of this application provides an apparatus, including a processor and a memory. The memory is configured to store a computer-executable instruction. When the apparatus runs, the processor executes the computer-executable instruction stored in the memory, to enable the apparatus to perform the method performed by the terminal device according to any one of the embodiments of the first aspect, or enable the apparatus to perform the method performed by the terminal device according to any one of the embodiments of the second aspect, or enable the apparatus to perform the method performed by the network device according to any one of the embodiments of the third aspect.

According to a sixth aspect, an embodiment of this application further provides a communications system. The communications system includes the terminal device according to any of the embodiments of the first aspect and/or the embodiments of the second aspect and the network device.

According to a seventh aspect, an embodiment of this application further provides a computer-readable storage medium, and the computer-readable storage medium stores an instruction. When the instruction is run on a computer, the computer is enabled to perform the methods according to the foregoing aspects.

According to an eighth aspect, an embodiment of this application further provides a computer program product including an instruction. When the computer program product runs on a computer, the computer is enabled to perform the methods according to the foregoing aspects.

These aspects or other aspects of this application are clearer and more comprehensible in descriptions of the following embodiments.

DETAILED DESCRIPTION

To make objectives, technical solutions, and advantages of this application clearer, the following further describes this application in detail with reference to the accompanying drawings. One or more operations of any of the method embodiments, as described herein, may also be applied to an apparatus embodiment and/or a system embodiment. In descriptions of this application, unless otherwise stated, "a plurality of" means two or more than two.

The following clearly describes the technical solutions in the embodiments of this application with reference to the accompanying drawings in the embodiments of this application.

Figure 1A:
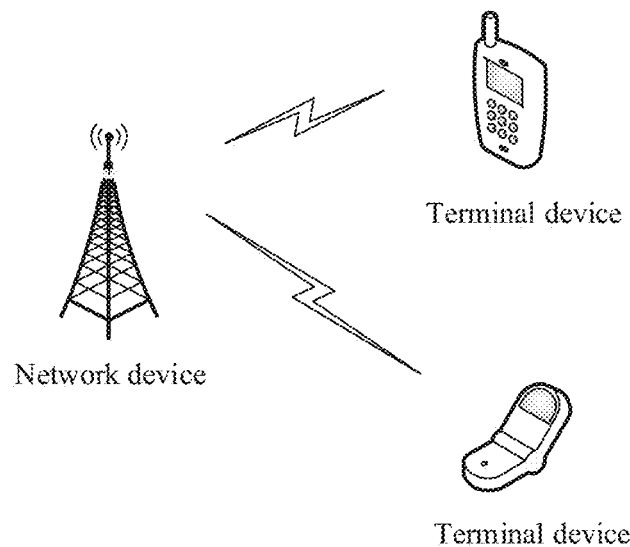
FIG. 1a is an example schematic architectural diagram of a communications system, according to some embodiments of the disclosure.

FIG. 1a is an example schematic architectural diagram of a communications system to which embodiments of this application are applicable. The communications system shown in FIG. 1a includes a network device and a terminal device. It should be understood that FIG. 1a is merely an example schematic architectural diagram of the communications system. A quantity of network devices and a quantity of terminal devices in the communications system are not limited in the embodiments of this application. The communications system to which the embodiments of this application are applicable may include other devices, such as a core network device, a wireless relay device, and/or a wireless backhaul device in addition to the network device and the terminal device. This is not limited in the embodiments of this application either. In some embodiments, the network device in the embodiments of this application may integrate (e.g., include, combine, embed) some or all functions into one independent physical device, or may distribute the functions on a plurality of independent physical devices. This is not limited in the embodiments of this application either. In addition, the terminal device in the embodiments of this application may be connected to the network device in a wireless manner.

In some embodiments, the network device may be a device capable of communicating with the terminal device. In some embodiments, the network device may be any device having a wireless transceiver function, and includes but is not limited to: a base station (for example, a NodeB NodeB, an evolved NodeB eNodeB, a gNodeB gNodeB in a 5G communications system, a base station or network device in a future communications system, an access node in a Wi-Fi system, a wireless relay node, and a wireless backhaul node) and the like. In some embodiments, the network device may alternatively be a radio controller in a cloud radio access network (cloud radio access network, CRAN) scenario. In some embodiments, the network device may alternatively be a small cell, a transmission node (e.g., transmission reference point, TRP), or the like. Definitely, this application is not limited thereto.

The terminal device may be a device having a wireless transceiver function, and may be deployed on land, such as indoor or outdoor devices, handheld devices, wearable devices, or vehicle-mounted devices; may be deployed on water (for example, on a ship); or may be deployed in the air (for example, on an airplane, a balloon, and/or a satellite). The terminal device may be a mobile phone (mobile phone), a tablet computer (e.g., Pad), a computer having a wireless transceiver function, a virtual reality (Virtual Reality, VR) terminal device, an augmented reality (Augmented Reality, AR) terminal device, a wireless terminal in industrial control (industrial control), a wireless terminal in self-driving (autonomousautonomous vehicles), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. In some embodiments, the terminal device may be referred to as user equipment (user equipment, UE), an access terminal device, a UE unit, a UE station, a mobile station, a remote station, a remote terminal device, a mobile device, a UE terminal device, a terminal device, a wireless communications device, a UE agent, a UE apparatus, or the like.

This application provides descriptions by using the architecture shown in FIG. 1a as an example, but the architecture is not limited thereto. For example, a communication method provided in the embodiments of this application may be applied between macro base stations, and/or between micro base stations.

Communications systems to which the foregoing system architecture is applicable include but are not limited to a time division duplex-long term evolution (Time Division Duplexing-Long Term Evolution, TDD LTE) system, a frequency division duplex-long term evolution (Frequency Division Duplexing-Long Term Evolution, FDD LTE) system, a long term evolution-advanced (Long Term Evolution-Advanced, LTE-A) system, and/or various future evolved wireless communications systems such as a 5G NR communications system.

The 5G NR communications system is used as an example. The 5G NR communications system supports a URLLC scenario. In the URLLC scenario, a network needs to be capable of being used to send a data packet of a specific size from one transceiver (for example, a network device) to another transceiver (for example, a terminal device) based on specified ultra-high reliability within a specified ultra-short time. For example, the specified ultra-short time may be 1 millisecond (ms), and the specified ultra-high reliability is 99.999%. The data packet of the specific size may be determined (e.g., identified, selected) based on a specific application scenario. If the data packet is a control message in Industry 4.0, the size of the data packet may be only equal to or less than 100 bytes. If the data packet is a video in remote driving, the size of the data packet may reach 6000 bytes.

It should be noted that, a frequency domain resource used by the terminal device in the embodiments of this application may be a frequency range, and may be represented as one or more component carriers (component carrier, CC), or may be represented as one or more bandwidth parts (bandwidth part, BWP). The network device may communicate with the terminal device on the frequency domain resource used by the terminal device, for example, send data to the terminal device.

Figure 1B:
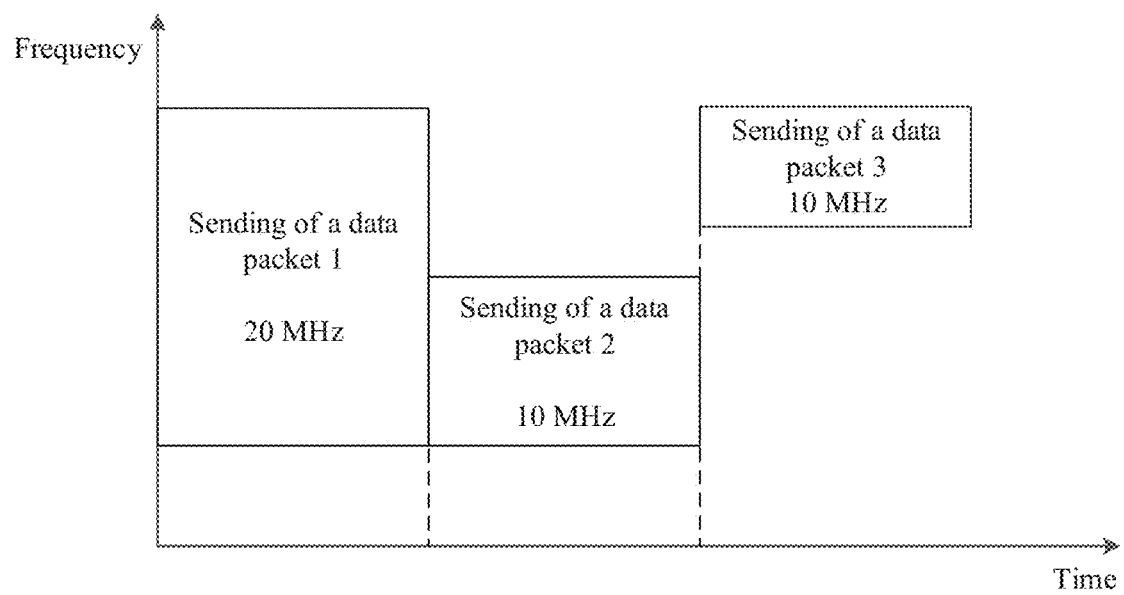
FIG. 1b is an example schematic diagram of a frequency domain resource used by a network device to send data to a terminal device, according to some embodiments of the disclosure.

FIG. 1b is an example schematic diagram of a frequency domain resource used by a network device to send data to a terminal device, according to some embodiments of the disclosure. For example, a frequency domain resource used by the terminal device is one BWP. If a bandwidth of the BWP is 20 MHz (Mega Hertz) and/or 20 MHz+/−20%, the network device may send the data to the terminal device in the BWP, or may send the data to the terminal device on a part of frequency domain resource in the BWP. As shown in FIG. 1b, the network device may send a data packet 1 to the terminal device on a frequency domain resource having a bandwidth of 20 MHz, send a data packet 2 to the terminal device on a frequency domain resource having a bandwidth of 10 MHz, and/or send a data packet 3 to the terminal device on a frequency domain resource having a bandwidth of 5 MHz. In some embodiments, the frequency domain resource having a bandwidth of 10 MHz or the frequency domain resource having a bandwidth of 5 MHz may be understood as a segment of frequency domain resource. Alternatively, if the frequency domain resource used by the terminal device is understood as a band, the frequency domain resource having a bandwidth of 10 MHz or the frequency domain resource having a bandwidth of 5 MHz may also be understood as a subband. It can be learned from FIG. 1b that because different data packets may have different transmission requirements, the network device may determine, based on a transmission requirement of a data packet and channel quality information, a frequency domain resource used to send the data packet to the terminal.

In the communications system shown in FIG. 1a, the network device may send a reference signal to the terminal device. Correspondingly, the terminal device may determine the channel quality information based on the reference signal and report the channel quality information to the network device.

In an example implementation (sometimes referred to as, "implementation 1" for short for ease of description), the terminal device may perform (e.g., execute, implement) channel quality measurement on the frequency domain resource used by the terminal device, to obtain (e.g., retrieves, receives, gathers) a wideband channel quality indicator (wideband channel quality indication, WB-CQI) value. In some embodiments, the WB-CQI value reflects transmission efficiency of sending data by the network device on the frequency domain resource used by the terminal device. In some embodiments, if a data packet that needs to be sent by the network device is relatively small, and can be transmitted only on a part of the frequency domain resource used by the terminal device, because the network device cannot learn of channel quality information of the part of the frequency domain resource, the network device may fail to properly determine, based on the channel quality information, a frequency domain resource used to transmit the data packet, and transmission of the data packet is affected.

In an example implementation (sometimes referred to as, "implementation 2"), the terminal device divides (e.g., separates, splits) the frequency domain resource used by the terminal device into a plurality of segments of frequency domain resources (or referred to as a plurality of subbands (Subband)). In some embodiments, the terminal device performs channel measurement on each segment of frequency domain resource, and reports channel quality information of each segment of frequency domain resource. In some embodiments, if a data packet that needs to be sent by the network device is relatively large, and may need to be sent on a plurality of segments of frequency domain resources, because the network device cannot learn of transmission efficiency of transmitting one data packet on a plurality of segments of frequency domain resources, the network device may fail to properly determine, based on the channel quality information, a frequency domain resource used to transmit the data packet, and transmission of the data packet is affected.

In an example implementation (sometimes referred to as, "implementation 3" for short for ease of description), the terminal device may divide the frequency domain resource used by the terminal device into a plurality of segments of frequency domain resources, and predefines A. In some embodiments, the terminal device measures (e.g., generates, calculates, determines) channel quality obtained after A segments of frequency domain resources having best channel quality are aggregated, to obtain channel quality information of the A segments of frequency domain resources, and/or reports the channel quality information to the network device. In some embodiments, if a data packet that needs to be sent by the network device is relatively large, and may need to be sent on more than A segments of frequency domain resources, because the network device cannot learn of transmission efficiency of transmitting one data packet on more than A segments of frequency domain resources, the network device may fail to properly determine, based on the channel quality information, a frequency domain resource used to transmit the data packet, and transmission of the data packet is affected.

It can be learned based on the foregoing content that because the size of the data packet that needs to be sent by the network device is not considered when the terminal device determines the channel quality information, the network device may fail to properly determine, based on the channel quality information determined by the terminal device, the frequency domain resource used to transmit the data packet. Based on this, the embodiments of this application provide a channel quality information determining method, specifically including: A terminal device may obtain a configured transport block size (the configured transport block size), and/or determine channel quality information of a frequency domain resource based on the transport block size (transport block size, TBS). In other words, the TBS may be fully considered when the terminal device determines the channel quality information of the frequency domain resource (where for example, the TBS may be used as an input for calculating the channel quality information), so that a network device properly determines, based on the channel quality information, a frequency domain resource used to transmit a data packet, thereby meeting a transmission requirement and effectively improving efficiency of transmitting the data packet.

The terminal device may obtain the configured TBS in a plurality of manners. For example, in a manner 1, the TBS may be preconfigured in a protocol. In a manner 2, the network device configures the TBS, and sends the configured TBS to the terminal device. It should be noted that in both the manner 1 and the manner 2, the TBS may be configured based on an application scenario or a service type. For example, in a remote driving scenario, the TBS may be configured as 6000 bytes. In the embodiments of this application, the configured TBS may be a fixed value for an application scenario or a service type.

In some embodiments, there may be two cases in which the terminal device determines the channel quality information of the frequency domain resource based on the TBS. Case 1: The terminal device determines channel quality information of each of K segments of frequency domain resources in N segments of frequency domain resources of the terminal device based on the TBS and/or a time domain resource range, where both N and K are integers greater than or equal to 1, and K is less than or equal to N. Case 2: The terminal device determines channel quality information of M segments of frequency domain resources in W segments of frequency domain resources of the terminal device based on the TBS and/or a time domain resource range, where both W and M are integers greater than or equal to 1, and M is less than or equal to W. The time domain resource range may be configured by the network device and sent to the terminal device, or may be preconfigured in a protocol. This is not specifically limited. In an example, the time domain resource range may be configured based on the application scenario or the service type. For example, in the remote driving scenario, the time domain resource range may be 1 ms. For another example, the time domain resource range may alternatively be in a unit of a symbol, for example, may be two symbols (symbol).

Detailed descriptions are provided below with reference to specific embodiments.

Illustrative Embodiment(s): Group 1

Figure 2:
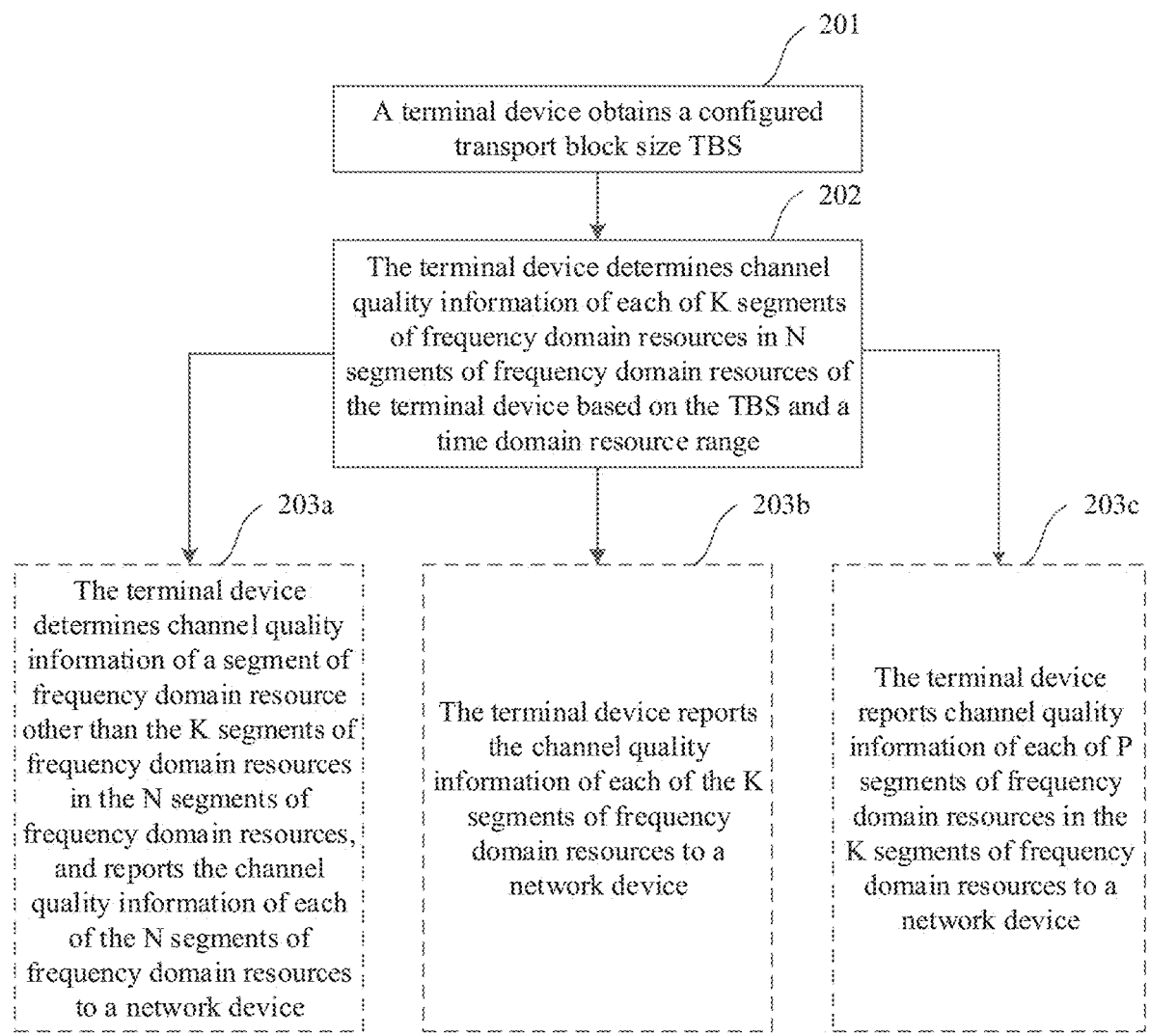
FIG. 2 is an example schematic flowchart corresponding to a channel quality information determining method, according to some embodiments of the disclosure.

FIG. 2 is an example schematic flowchart corresponding to a channel quality information determining method, according to some embodiments of the disclosure. As shown in FIG. 2, the method 200 may include one or more of the following operations.

Operation 201. A terminal device obtains a configured transport block size TBS.

Operation 202. The terminal device determines channel quality information of each of K segments of frequency domain resources in N segments of frequency domain resources of the terminal device based on the TBS and a time domain resource range.

In some embodiments, a value of N may be independently determined by the terminal device. A value of K may be independently determined by the terminal device, or may be determined by the terminal device based on received indication information that is for K and that is sent by a network device.

In some embodiments, after receiving a reference signal sent by the network device, the terminal device may determine the channel quality information of each of the K segments of frequency domain resources in the N segments of frequency domain resources of the terminal device based on the TBS, the time domain resource range, and/or the reference signal. In some embodiments, the reference signal may be used to perform channel measurement or channel quality estimation. In an example, the reference signal may be a cell-specific reference signal (cell-specific reference signal, CRS), a demodulation reference signal (demodulation reference signal, DMRS), a channel state information-reference signal (channel state information-reference signal, CSI-RS), or the like. This is not specifically limited. The channel quality information determined by the terminal device based on the reference signal may include any one or any combination of the following: a reference signal received power (reference signal received power, RSRP), a reference signal received quality (reference signal received quality, RSRQ), a channel quality indicator (channel quality indication, CQI), and/or transmission efficiency. In some embodiments, the channel quality information may further include other content. This is not specifically limited.

In an example, the channel quality information that is of each segment of frequency domain resource and that is obtained by the terminal device may be represented as a differential value obtained through differentiation. For example, if the channel quality information is the CQI, a WB-CQI may be used as a standard, and a CQI of each segment of frequency domain resource may be represented by using the WB-CQI and a differential (offset) function. For example, if the WB-CQI is 10, and a CQI of a frequency domain resource a1 is 12, the CQI of the frequency domain resource a1 may be represented as the WB-CQI+2. In this case, channel quality information of the frequency domain resource a1 may be represented as a differential value of the CQI of the frequency domain resource a1, namely, 2. For another example, if the channel quality information is the transmission efficiency, basic efficiency may be used as a standard, and transmission efficiency of each segment of frequency domain resource may be represented by using basic efficiency of the segment of frequency domain resource and a differential (offset) function. For example, if an index value (index) corresponding to basic efficiency of a frequency domain resource a1 is 10, and an index corresponding to transmission efficiency of the frequency domain resource a1 is 13, the transmission efficiency of the frequency domain resource a1 may be represented as 10+3. In this case, channel quality information of the frequency domain resource a1 may be represented as a differential value of the transmission efficiency of the frequency domain resource a1, namely, 3. Further, if a differential value of transmission efficiency of a segment of frequency domain resource is less than 0, it indicates that a transmission requirement of a data packet may not be met if the data packet is transmitted on the segment of frequency domain resource. If a differential value of transmission efficiency of a segment of frequency domain resource is greater than or equal to 0, it indicates that a transmission requirement of a data packet may be met if the data packet is transmitted on the segment of frequency domain resource.

In an example implementation, that the terminal device determines the channel quality information of each of the K segments of frequency domain resources in the N segments of frequency domain resources of the terminal device based on the TBS, the time domain resource range, and/or the reference signal may be specifically: The terminal device determines, based on the TBS, the time domain resource range, and the reference signal, that an estimated data volume of each of the K segments of frequency domain resources of the terminal device in the time domain resource range meets a TBS requirement, and/or determines the channel quality information of each of the K segments of frequency domain resources. That an estimated data volume of a segment of frequency domain resource in the time domain resource range meets the TBS requirement may mean that the estimated data volume of the segment of frequency domain resource in the time domain resource range (which may also be understood as a volume of data that can be carried on the segment of frequency domain resource in the time domain resource range during data transmission performed based on channel quality that is of the segment of frequency domain resource and that is estimated by the terminal device) is greater than or equal to the TBS, or that transmission efficiency of the segment of frequency domain resource in the time domain resource range is greater than or equal to basic efficiency of the segment of frequency domain resource. The basic efficiency of the segment of frequency domain resource may be determined based on the TBS and a quantity of resource elements (resource element, RE) included in the segment of frequency domain resource in the time domain resource range. For example, the basic efficiency of the segment of frequency domain resource=the TB S/the quantity of REs included in the segment of frequency domain resource in the time domain resource range. The transmission efficiency of the segment of frequency domain resource in the time domain resource range=the estimated data volume of the segment of frequency domain resource in the time domain resource range/the quantity of REs included in the segment of frequency domain resource in the time domain resource range.

In some embodiments, considering that some segments of frequency domain resources may include an RE that cannot be used to transmit data, in calculation of the transmission efficiency and the basic efficiency, the quantity of REs included in the segment of frequency domain resource in the time domain resource range may be specifically a quantity of available REs (e.g., a quantity of REs that can be used to transmit data) included in the segment of frequency domain resource in the time domain resource range.

Figure 3:
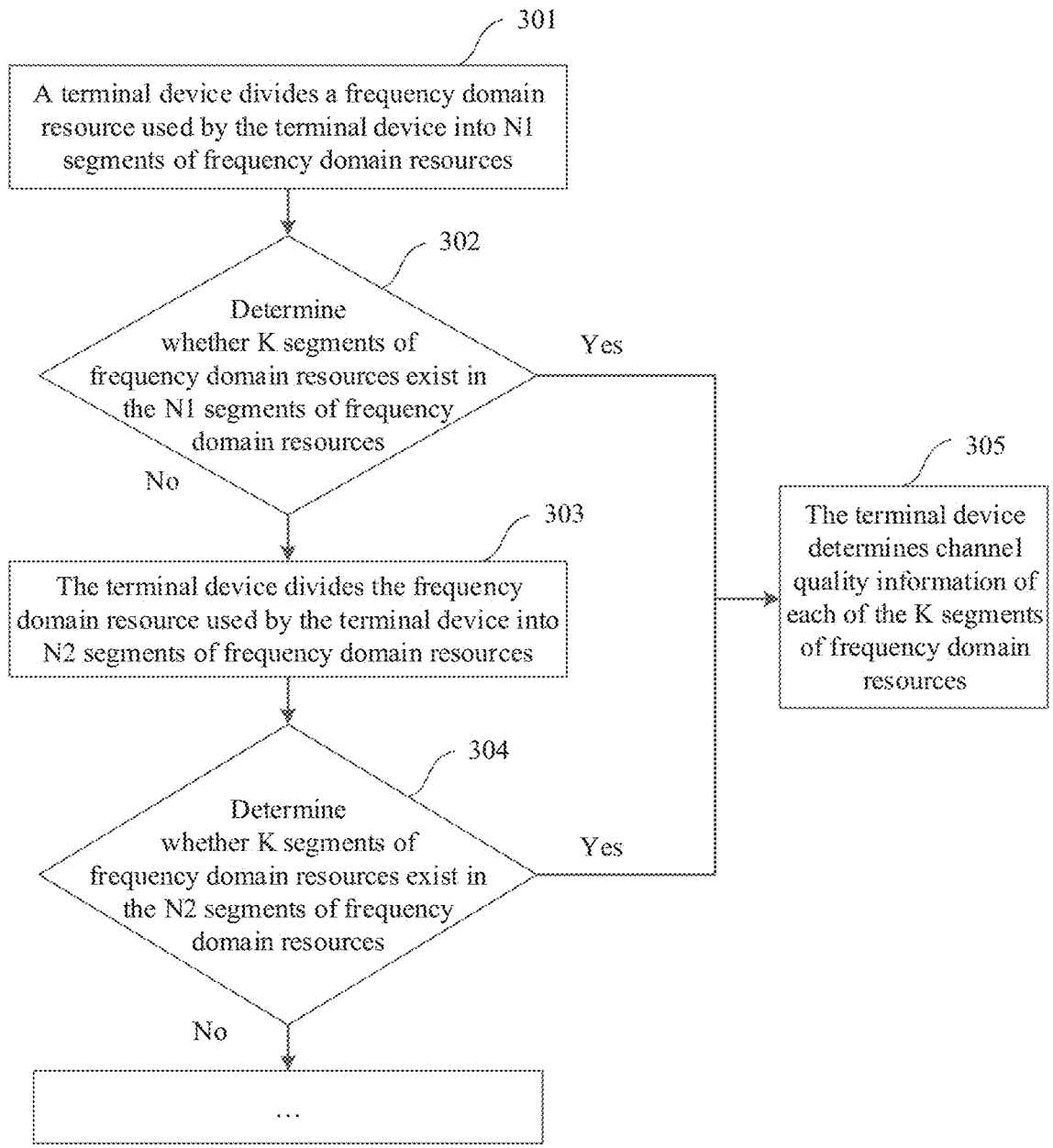
FIG. 3 is an example schematic diagram of an implementation process in which a terminal device determines channel quality information of each of K segments of frequency domain resources, according to some embodiments of the disclosure.

Specifically, in an example implementation, FIG. 3 is an example schematic diagram of an implementation process in which the terminal device determines the channel quality information of each of the K segments of frequency domain resources, according to some embodiments of the disclosure. As shown in FIG. 3, the method 300 may include one or more of the following operations.

Operation 301. The terminal device divides a frequency domain resource used by the terminal device into N1 segments of frequency domain resources.

In some embodiments, the terminal device may divide, according to a division rule, the frequency domain resource used by the terminal device. The division rule may be pre-agreed on by the network device and the terminal device, or may be preconfigured in a protocol. This is not specifically limited. The division rule may be: performing, in ascending order of frequencies, successive division starting from a start position on the frequency domain resource used by the terminal device; or performing, in descending order of frequencies, successive division starting from an end position on the frequency domain resource used by the terminal device; or performing successive division starting from a position such as a reference position on the frequency domain resource used by the terminal device to two ends; or performing division starting from a reference position in ascending order of frequencies; or performing division starting from a reference position in descending order of frequencies. This is not specifically limited. In some embodiments, it may be understood that the position on the frequency domain resource herein may be a frequency, a component carrier number, a BWP number, or other information that can be used to determine the frequency or a frequency range.

For example, the division rule followed by the terminal device is performing successive division in ascending order of frequencies. In some embodiments, the terminal device may first determine a quantity (for example, N1) of segments that need to be obtained through division; then determine, based on a bandwidth of the frequency domain resource used by the terminal device and the quantity of segments that need to be obtained through division, a standard bandwidth for dividing the frequency domain resource; and/or successively divide the frequency domain resource in ascending order of frequencies based on the standard bandwidth. Alternatively, the terminal device may first determine a standard bandwidth for dividing the frequency domain resource, and/or successively divide the frequency domain resource in ascending order of frequencies based on the standard bandwidth, to finally obtain the N1 segments of frequency domain resources.

Figure 4A:
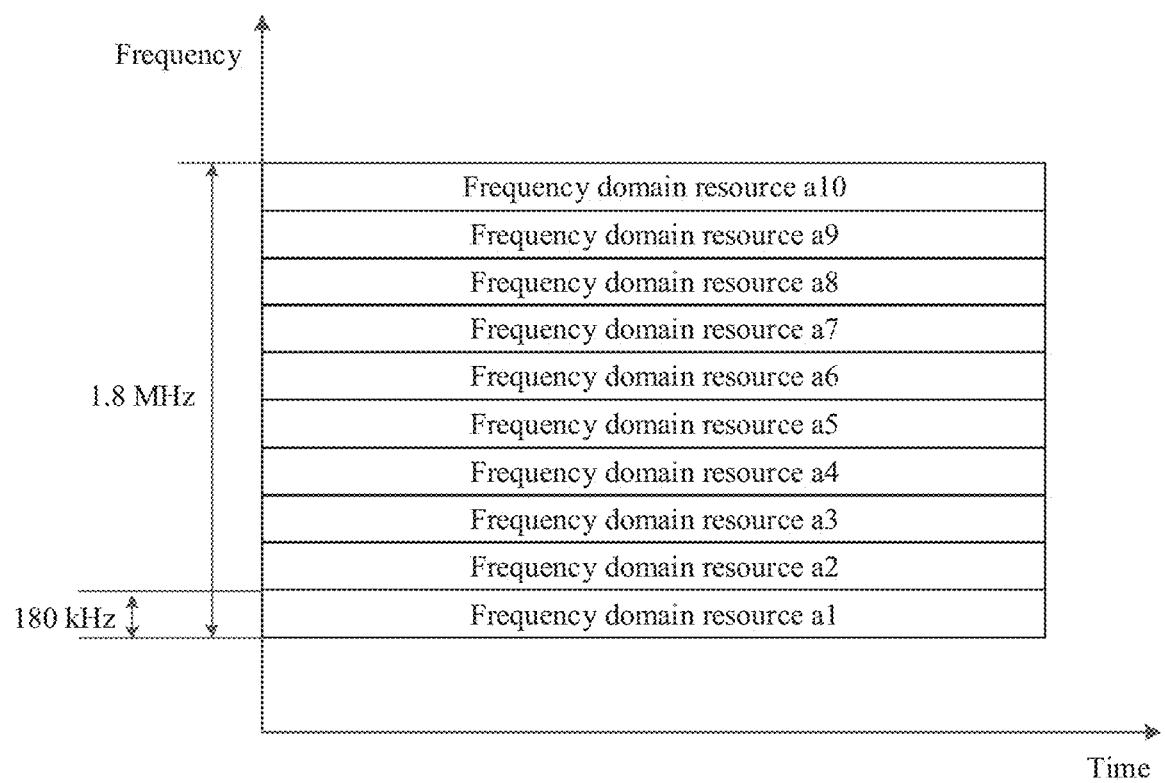
FIG. 4a is an example diagram of dividing, by a terminal device, a frequency domain resource used by the terminal device, according to some embodiments of the disclosure.
Figure 4B:
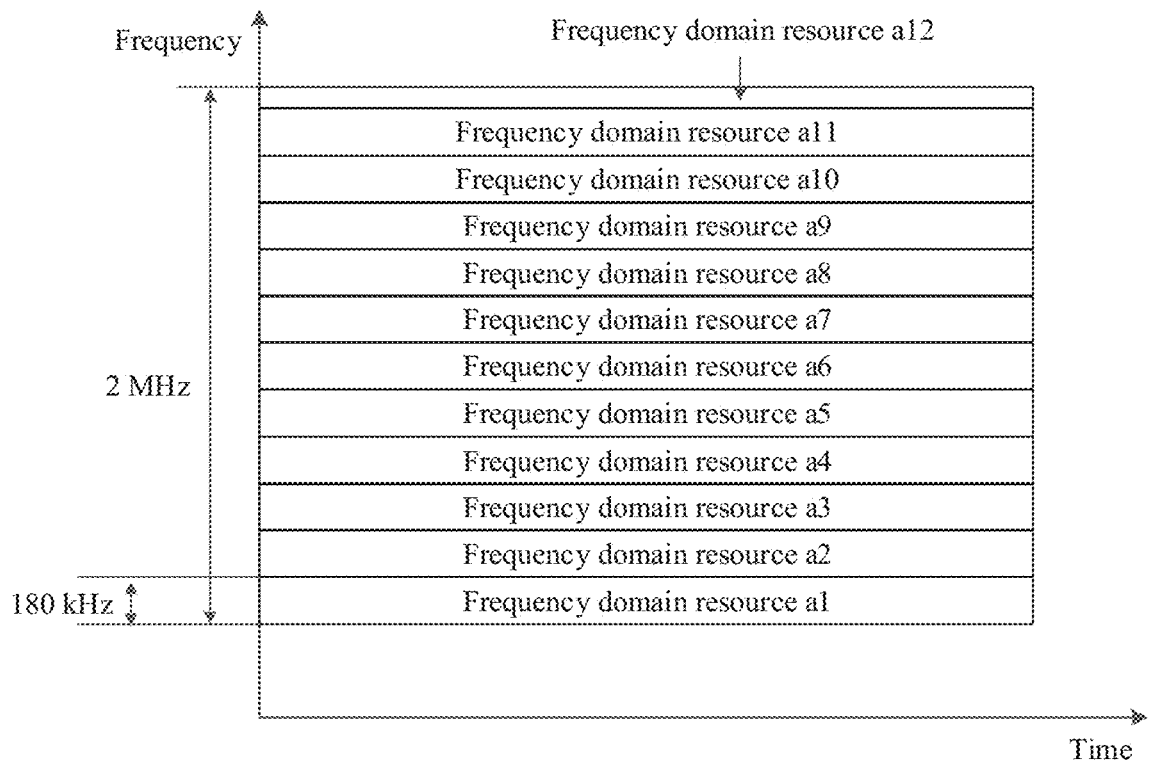
FIG. 4b is an example diagram of dividing, by a terminal device, a frequency domain resource used by the terminal device, according to some embodiments of the disclosure.

Bandwidths of a plurality of segments of frequency domain resources obtained by the terminal device through division may be completely the same, or may not be completely the same. For example, FIG. 4a is an example diagram of dividing, by a terminal device, a frequency domain resource used by the terminal device, according to some embodiments of the disclosure. In some embodiments, the bandwidth of the frequency domain resource used by the terminal device is 1.8 MHz, and/or the standard bandwidth for dividing the frequency domain resource is 180 kHz (kilohertz). In some embodiments, 10 segments of frequency domain resources, namely, a frequency domain resource a1, a frequency domain resource a2, . . . , and a frequency domain resource a10, are obtained in total by successively dividing the frequency domain resource in ascending order of frequencies. In some embodiments, bandwidths of the 10 segments of frequency domain resources are all equal to the standard bandwidth, namely, 180 kHz. As another example, as shown in FIG. 4b, the bandwidth of the frequency domain resource used by the terminal device is 2 MHz, and/or the standard bandwidth for dividing the frequency domain resource is 180 kHz. In some embodiments, 12 segments of frequency domain resources, namely, a frequency domain resource b1, a frequency domain resource b2, . . . , and/or a frequency domain resource b12, may be obtained in total by successively dividing the frequency domain resource in ascending order of frequencies. In some embodiments, bandwidths of the 12 segments of frequency domain resources are not completely the same. In some embodiments, the bandwidths of the frequency domain resource b1 to the frequency domain resource b11 are the same as the standard bandwidth, and the bandwidth of the frequency domain resource b12 is 20 kHz. In other words, when the terminal device divides the frequency domain resource, if the bandwidth of the frequency domain resource used by the terminal device is exactly an integer multiple of the standard bandwidth, the bandwidths of the plurality of segments of frequency domain resources obtained through division are all equal to the standard bandwidth. In some embodiments, if the bandwidth of the frequency domain resource used by the terminal device is not an integer multiple of the standard bandwidth, a bandwidth of the last segment of frequency domain resource obtained through division is less than the standard bandwidth.

Operation 302. The terminal device may determine (e.g.) whether the K segments of frequency domain resources exist in the N1 segments of frequency domain resources (where the estimated data volume of each of the K segments of frequency domain resources in the time domain resource range meets the TBS requirement); and if the K segments of frequency domain resources do not exist, performs operation 303; or if the K segments of frequency domain resources exist, performs operation 305.

In some embodiments, the terminal device may separately perform channel estimation on the N1 segments of frequency domain resources based on the reference signal. For each segment of frequency domain resource, in some embodiments, the terminal device calculates a volume of data (namely, an estimated data volume) that can be carried on the segment of frequency domain resource in the time domain resource range during data transmission performed based on estimated channel quality of the segment of frequency domain resource. The terminal device separately compares the estimated data volumes of the N1 segments of frequency domain resources with the TBS. If there are K segments of frequency domain resources whose estimated data volumes in the time domain resource range are all greater than or equal to the TBS, the terminal device determines that the K segments of frequency domain resources exist; otherwise, the terminal device determines that the K segments of frequency domain resources do not exist.

Operation 303. The terminal device divides the frequency domain resource used by the terminal device into N2 segments of frequency domain resources. For a specific implementation of the division, refer to the descriptions in operation 301.

Operation 304. The terminal device determines whether the K segments of frequency domain resources exist in the N2 segments of frequency domain resources (where the estimated data volume of each of the K segments of frequency domain resources in the time domain resource range meets the TBS requirement); and if the K segments of frequency domain resources exist, performs operation 305; or if the K segments of frequency domain resources do not exist, further attempts to divide the frequency domain resource used by the terminal device. Details are not described one by one again.

Operation 305. The terminal device determines the channel quality information of each of the K segments of frequency domain resources.

In some embodiments, the terminal device may obtain the channel quality information of each segment of frequency domain resource based on estimated channel quality of the segment of frequency domain resource.

It can be learned from the foregoing content that, the terminal device may attempt for a plurality of times to divide the frequency domain resource, to determine an effective division manner. The effective division manner is that the frequency domain resource used by the terminal device is divided into the N segments of frequency domain resources, and/or the K segments of frequency domain resources exist in the N segments of frequency domain resources (where the estimated data volume of each of the K segments of frequency domain resources in the time domain resource range meets the TBS requirement). In some embodiments, there may be only one effective division manner (where in this case, there is only one value of N); or there may be a plurality of effective division manners (where in this case, there are a plurality of values of N). If there are a plurality of effective division manners, in an example, after obtaining an effective division manner through a division attempt, the terminal device may determine the channel quality information of each of the K segments of frequency domain resources based on the effective division manner, without considering another effective division manner. In another example, the terminal device may traverse various possible division manners, select an effective division manner from the plurality of effective division manners, and determine the channel quality information of each of the K segments of frequency domain resources based on the selected effective division manner. A specific selection standard may be set by a person skilled in the art, and is not specifically limited herein.

In some embodiments, operation 301 and operation 302 may be combined for processing. To be specific, the terminal device may alternatively obtain a segment of frequency domain resource segment by segment according to the division rule, and determine whether an estimated data volume of the segment of frequency domain resource in the time domain resource range meets the TBS requirement. If obtaining K segments of frequency domain resources that meet the TB S requirement, the terminal device may not continue to divide a remaining part of the frequency domain resource.

It should be noted that if there is no effective division manner, to be specific, the terminal device traverses various possible division manners according to the division rule, and the K segments of frequency domain resources do not exist in any division manner (where the estimated data volume of each of the K segments of frequency domain resources in the time domain resource range meets the TBS requirement), in an example, the terminal device may report first indication information or channel quality information of S segments of frequency domain resources to the network device, where the first indication information is used to indicate that the frequency domain resource used by the terminal device does not meet the TBS requirement, and the S segments of frequency domain resources are S segments of frequency domain resources that are in the N segments of frequency domain resources used by the terminal device and whose estimated data volumes are the largest in the time domain resource range, where S is an integer greater than or equal to 1, and S is less than or equal to N. In another example, the terminal device may report the channel quality information to the network device through the foregoing implementation 1, implementation 2, or implementation 3.

In some embodiments, the method 200 shown in FIG. 2 may include operation 203a, operation 203b, or operation 203c.

Operation 203a. The terminal device determines channel quality information of a segment of frequency domain resource other than the K segments of frequency domain resources in the N segments of frequency domain resources, and reports the channel quality information of each of the N segments of frequency domain resources to the network device.

Specifically, the terminal device may report the channel quality information of each of the N segments of frequency domain resources to the network device in a plurality of manners.

In some embodiments, using the case shown in FIG. 4a as an example, the terminal device may report an identifier of each of the 10 segments of frequency domain resources and corresponding channel quality information to the network device. In this way, after receiving information reported by the terminal device, the network device may determine, based on a quantity of identifiers of the frequency domain resources, that the frequency domain resource used by the terminal device is divided into 10 segments; and may determine, according to the division rule pre-agreed on by the network device and the terminal device (or the division rule preconfigured in the protocol), that the 10 segments of frequency domain resources are obtained through successive division performed in ascending order of frequencies and that the bandwidth of each segment of frequency domain resource is 180 kHz. Alternatively, the terminal device may further report indication information for N (referred to as indication information n for short for ease of description) to the network device, where the indication information n is used to indicate the value of N (namely, N=10). In this way, the network device may determine, based on the value of N, that the frequency domain resource used by the terminal device is divided into 10 segments; and may determine, according to the division rule pre-agreed on by the network device and the terminal device (or the division rule preconfigured in the protocol), that the 10 segments of frequency domain resources are obtained through successive division performed in ascending order of frequencies and that the bandwidth of each segment of frequency domain resource is 180 kHz. Alternatively, the terminal device may further report, to the network device, the standard bandwidth (for example, 180 kHz) for dividing the frequency domain resource. In this way, the network device may determine, according to the division rule pre-agreed on by the network device and the terminal device (or the division rule preconfigured in the protocol), that the frequency domain resource used by the terminal device is successively divided into 10 segments in ascending order of frequencies and that the bandwidth of each segment of frequency domain resource is 180 kHz.

It should be noted that, in this embodiment of this application, a specific bandwidth value is merely used as an example to describe the standard bandwidth. It may be understood that the standard bandwidth for dividing the frequency domain resource may alternatively be a quantity of frequency domain units, where the frequency domain unit may be a physical resource block (physical resource block, PRB) or a resource block (resource block, RB). This is not specifically limited.

An identifier of a segment of frequency domain resource may be information that can be used to identify the segment of frequency domain resource. For example, four bits may be used to identify each of the 10 segments of frequency domain resources. In this embodiments, the network device and the terminal device may pre-agree on a manner of identifying a frequency domain resource by using bits. For example, the segments of frequency domain resources are sequentially indicated in ascending order of values represented by the four bits. 0000 represents the frequency domain resource a1, 0001 represents the frequency domain resource a2, and the rest can be deduced by analogy.

For example, the channel quality information is the transmission efficiency, and Table 1 shows an example of the identifiers of the 10 segments of frequency domain resources and the corresponding channel quality information.

TABLE 1

Example of the identifiers of the 10 segments of frequency domain resources and the corresponding channel quality information

| Identifier of each segment of frequency domain resource | Corresponding channel quality information (expressed in a form of a differential value) |
|---|---|
| 0000 (represents the frequency domain resource a1) | −1 |
| 0001 (represents the frequency domain resource a2) | 2 |
| 0010 (represents the frequency domain resource a3) | 1 |
| ... | ... |
| 1001 (represents the frequency domain resource a10) | 0 |

Because the network device and the terminal device may pre-agree on a manner of identifying each segment of frequency domain resource, the network device may determine that 0000 represents the frequency domain resource a1, 0001 represents the frequency domain resource a2, and 1001 represents the frequency domain resource a10. In the foregoing manner, the network device may obtain the channel quality information of each segment of frequency domain resource, and may subsequently properly determine, based on the channel quality information of each segment of frequency domain resource, a frequency domain resource used to send a data packet. In addition, because the terminal device may report the channel quality information of each segment of frequency domain resource in a differential form, it is more convenient for the network device to select the frequency domain resource used to send data.

For example, it can be learned from Table 1 that, the channel quality information of the frequency domain resource a1 is less than 0, and this indicates that a transmission requirement of a data packet may not be met if the data packet is transmitted on the frequency domain resource a1; the channel quality information of the frequency domain resource a2, the frequency domain resource a3, and the frequency domain resource a10 is greater than or equal to 0, and this indicates that a transmission requirement of a data packet may be met if the data packet is transmitted on the frequency domain resource a2, the frequency domain resource a3, or the frequency domain resource a10. In this way, the network device may select, based on a scheduling status of the frequency domain resource or another factor, a frequency domain resource (for example, the frequency domain resource a2, the frequency domain resource a3, or the frequency domain resource a10) whose channel quality information is greater than or equal to 0, to transmit the data packet.

In some embodiments, using the case shown in FIG. 4a as an example, the terminal device may use a plurality of fields of a same information element or message to separately carry channel quality information of the frequency domain resource a1 to the frequency domain resource a10. For example, a bit h0, a bit h1, and a bit h2 in the information element or message carry the channel quality information of the frequency domain resource a1; a bit h3, a bit h4, and a bit h5 carry the channel quality information of the frequency domain resource a2; a bit h6, a bit h7, and a bit h8 carry the channel quality information of the frequency domain resource a3; the rest may be deduced by analogy. In this way, after receiving the information element or message, the network device may determine, based on the channel quality information that is of the frequency domain resource a1 to the frequency domain resource a10 and that is carried in the information element or message, that the frequency domain resource of the terminal device is divided into 10 segments; and may determine, according to the division rule pre-agreed on by the network device and the terminal device (or the division rule preconfigured in the protocol), that the 10 segments of frequency domain resources are obtained through successive division performed in ascending order of frequencies and that the bandwidth of each segment of frequency domain resource is 180 kHz. In the foregoing manner, the network device may obtain the channel quality information of each segment of frequency domain resource, and may subsequently determine, based on the channel quality information of each segment of frequency domain resource, the frequency domain resource used to send the data packet. In some embodiments, the terminal device only needs to report the channel quality information of the frequency domain resource a1 to the frequency domain resource a10, to effectively reduce an amount of reported information, and reduce overheads of a transmission resource.

Operation 203b. The terminal device reports the channel quality information of each of the K segments of frequency domain resources to the network device.

In some embodiments, using the case shown in FIG. 4a as an example, it is assumed that K=5, and the K segments of frequency domain resources are the frequency domain resource a2, the frequency domain resource a3, the frequency domain resource a5, the frequency domain resource a7, and the frequency domain resource a10. The terminal device may report an identifier of each of the five segments of frequency domain resources and corresponding channel quality information to the network device. Further, the terminal device may report indication information for N or the standard bandwidth to the network device. In this way, the network device may determine, based on the value of N or the standard bandwidth and according to the division rule pre-agreed on by the network device and the terminal device (or the division rule preconfigured in the protocol), that the frequency domain resource used by the terminal device is successively divided into 10 segments in ascending order of frequencies and that the bandwidth of each segment of frequency domain resource is 180 kHz.

In an example, four bits may be used to identify each of the 10 segments of frequency domain resources. Further, the network device and the terminal device may pre-agree on a manner of identifying a frequency domain resource by using bits. For example, the channel quality information is the transmission efficiency, and Table 2 shows an example of the identifiers of the five segments of frequency domain resources and the corresponding channel quality information.

TABLE 2

Example of the identifiers of the five segments of frequency domain resources and the corresponding channel quality information

| Identifier of each segment of frequency domain resource | Corresponding channel quality information (expressed in a form of a differential value) |
|---|---|
| 0001 (represents the frequency domain resource a2) | 2 |
| 0010 (represents the frequency domain resource a3) | 1 |
| 0100 (represents the frequency domain resource a5) | 3 |
| 0110 (represents the frequency domain resource a7) | 0 |
| 1001 (represents the frequency domain resource a10) | 0 |

Because the network device and the terminal device may pre-agree on a manner of identifying each segment of frequency domain resource, the network device may determine that 0001 represents the frequency domain resource a2, 0010 represents the frequency domain resource a3, and 1001 represents the frequency domain resource a10. Further, the network device may obtain the channel quality information of each of the five segments of frequency domain resources, and may subsequently determine, based on the channel quality information of each segment of frequency domain resource, a frequency domain resource used to send a data packet.

Operation 203c. The terminal device reports channel quality information of each of P segments of frequency domain resources in the K segments of frequency domain resources to the network device, where P is an integer greater than or equal to 1 and less than K.

In an example, the P segments of frequency domain resources may be P segments of frequency domain resources that are in the K segments of frequency domain resources and whose estimated data volumes are the largest in the time domain resource range. Assuming that K=5 and P=3, the terminal device may sort the five segments of frequency domain resources in descending order of the estimated data volumes of the five segments of frequency domain resources in the time domain resource range, select three segments of frequency domain resources ranked at the top (where using Table 2 as an example, the three segments of frequency domain resources ranked at the top are the frequency domain resource a2, the frequency domain resource a3, and the frequency domain resource a5), and report the channel quality information of each of the P segments of frequency domain resources to the network device.

For a specific reporting manner, refer to the foregoing descriptions of reporting the channel quality information of each of the K segments of frequency domain resources. Details are not described herein again.

In the foregoing manner, the terminal device determines the channel quality information of each of the K segments of frequency domain resources in the N segments of frequency domain resources of the terminal device based on the TBS, to ensure that the estimated data volume of each of the K segments of frequency domain resources in the time domain resource range meets the TB S requirement, so that after the terminal device reports the channel quality information of each of the N, K, or P segments of frequency domain resources to the network device, the network device can properly determine the frequency domain resource used to transmit the data packet, thereby improving efficiency of transmitting the data packet.

Illustrative Embodiment(s): Group 2

Figure 5:
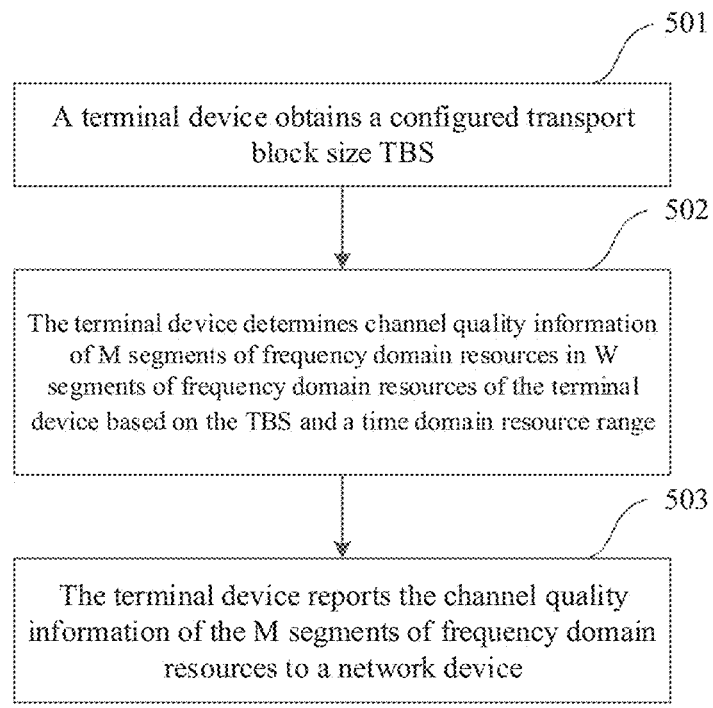
FIG. 5 is an example schematic flowchart corresponding to a channel quality information determining method, according to some embodiments of the disclosure.

FIG. 5 is an example schematic flowchart corresponding to a channel quality information determining method, according to some embodiments of the disclosure. As shown in FIG. 5, the method 500 may include one or more of the following operations.

Operation 501. A terminal device may obtain a configured transport block size TBS.

Operation 502. The terminal device may determine channel quality information of M segments of frequency domain resources in W segments of frequency domain resources of the terminal device based on the TBS and/or a time domain resource range.

In some embodiments, a value of W may be independently determined by the terminal device, may be determined by the terminal device based on received indication information that is for W and that is sent by a network device, and/or may be preconfigured (e.g., predetermined) in a protocol. In some embodiments, a value of M may be independently determined by the terminal device, may be determined by the terminal device based on received indication information that is for M and that is sent by the network device, and/or may be preconfigured in a protocol.

In this embodiment of this application, after receiving a reference signal sent by the network device, the terminal device may determine the channel quality information of the M segments of frequency domain resources in the W segments of frequency domain resources of the terminal device based on the TBS, the time domain resource range, and/or the reference signal. For related descriptions of the reference signal and/or the channel quality information, refer to the description of the embodiment(s) of Group 1, as discussed herein. The one or more embodiments of Group 2 may differ from the one or more embodiments of Group 1 in that the M segments of frequency domain resources may be used as a frequency domain resource combination, and/or the channel quality information of the M segments of frequency domain resources herein may be channel quality information corresponding to the M segments of frequency domain resources that is obtained by mapping, to the M segments of frequency domain resources in the combination, a data packet that has been encoded (e.g., encrypted, scrambled) and/or modulated.

In some embodiments, that the terminal device determines channel quality information of M segments of frequency domain resources of the terminal device based on the TBS and a time domain resource range may be specifically: The terminal device determines, in the W segments of frequency domain resources of the terminal device based on the TBS the time domain resource range, that a total estimated data volume of the M segments of frequency domain resources in the time domain resource range meets a TBS requirement; and determines the channel quality information of the M segments of frequency domain resources. That the total estimated data volume of the M segments of frequency domain resources in the time domain resource range meets the TB S requirement may mean that the total estimated data volume of the M segments of frequency domain resources in the time domain resource range (which may also be understood as a volume of data that can be carried on the M segments of frequency domain resources in the time domain resource range during data transmission performed based on channel quality that is of the M segments of frequency domain resources and that is estimated by the terminal device) is greater than or equal to the TBS, or that transmission efficiency of the M segments of frequency domain resources in the time domain resource range is greater than or equal to basic efficiency of the M segments of frequency domain resources. The basic efficiency of the M segments of frequency domain resources may be determined based on the TBS and a quantity of REs included in the M segments of frequency domain resources in the time domain resource range. For example, the basic efficiency of the M segments of frequency domain resources=the TB S/the quantity of REs included in the M segments of frequency domain resources in the time domain resource range. The transmission efficiency of the M segments of frequency domain resources in the time domain resource range=the estimated data volume of the M segments of frequency domain resources in the time domain resource range/the quantity of REs included in the M segments of frequency domain resources in the time domain resource range. In an example, the quantity of REs included in the M segments of frequency domain resources in the time domain resource range may be a quantity of available REs in the M segments of frequency domain resources in the time domain resource range.

Figure 6:
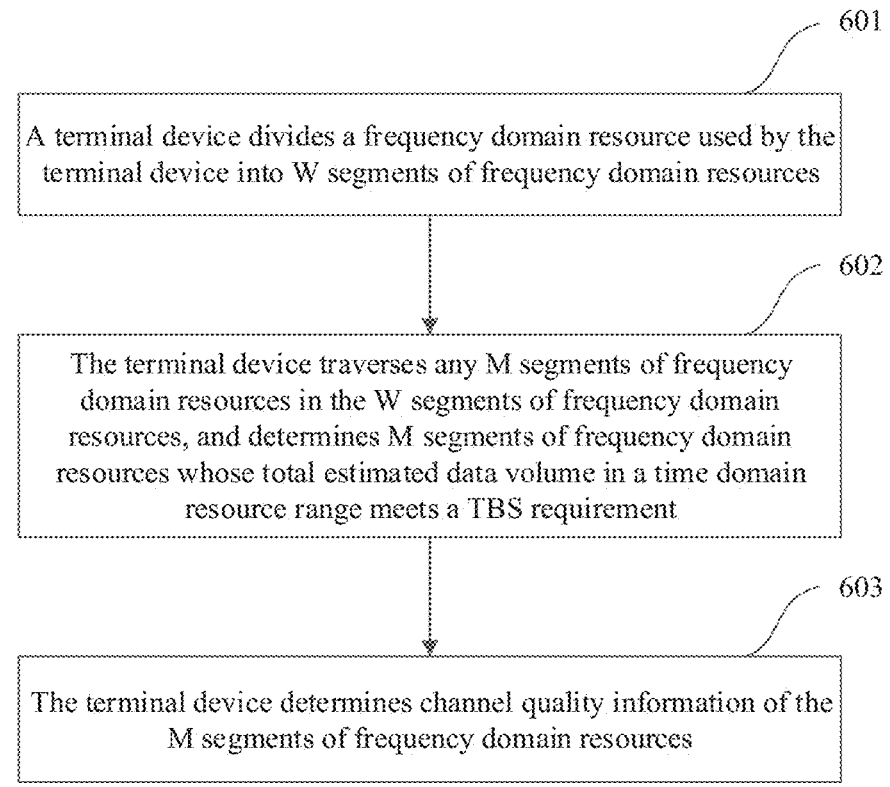
FIG. 6 is an example schematic diagram of an implementation process in which a terminal device determines channel quality information of M segments of frequency domain resources, according to some embodiments of the disclosure.

FIG. 6 is an example schematic diagram of an implementation process in which the terminal device determines the channel quality information of the M segments of frequency domain resources, according to some embodiments of the disclosure. As shown in FIG. 6, the method 600 may include one or more of the following operations.

Operation 601. The terminal device may divide a frequency domain resource used by the terminal device into the W segments of frequency domain resources. For a specific implementation of the division herein, refer to the related descriptions of operation 301 with respect to the embodiment(s) of Group 1.

Operation 602. The terminal device traverses any M segments of frequency domain resources in the W segments of frequency domain resources, and determines the M segments of frequency domain resources whose total estimated data volume in the time domain resource range meets the TBS requirement.

For example, W=10, and M=2. To be specific, the terminal device divides the frequency domain resource used by the terminal device into 10 segments of frequency domain resources, namely, a frequency domain resource c1, a frequency domain resource c2, . . . , and a frequency domain resource c10. In this case, any two segments of frequency domain resources are selected from the 10 segments of frequency domain resources, and there are $C_{10}^2$=45 possible combinations in total. Further, the terminal device may select, from the 45 possible combinations, a combination whose total estimated data volume in the time domain resource range meets the TBS requirement. For example, there are five combinations in total: a combination 1 (the frequency domain resource c1 and the frequency domain resource c2), a combination 2 (the frequency domain resource c1 and the frequency domain resource c4), a combination 3 (the frequency domain resource c3 and the frequency domain resource c5), a combination 4 (the frequency domain resource c3 and the frequency domain resource c8), and a combination 5 (the frequency domain resource c1 and the frequency domain resource c3).

Operation 603. The terminal device determines the channel quality information of the M segments of frequency domain resources.

In an example, the terminal device may determine channel quality information of each of the five selected combinations. In some embodiments, the channel quality information of each combination may be specifically channel quality information that corresponds to the combination and that is obtained by mapping, to the two segments of frequency domain resources in the combination, a data packet that has been encoded and modulated.

It should be noted that operation 601 to operation 603 are merely an example implementation of determining the channel quality information of the M segments of frequency domain resources. This implementation is described by using an example in which the M segments of frequency domain resources whose estimated data volume in the time domain resource range meets the TBS requirement exist in the W segments of frequency domain resources. In some embodiments, the M segments of frequency domain resources whose estimated data volume in the time domain resource range meets the TBS requirement may not exist in the W segments of frequency domain resources. In this case, in an example, the terminal device may report second indication information or channel quality information of T segments of frequency domain resources to the network device, where the second indication information is used to indicate that the frequency domain resource used by the terminal device does not meet the TBS requirement, and the T segments of frequency domain resources are T segments of frequency domain resources that are in the W segments of frequency domain resources used by the terminal device and whose total estimated data volume is the largest in the time domain resource range, where T is an integer greater than or equal to 1, and T is less than or equal to W. In another example, the terminal device may report the channel quality information to the network device through the foregoing implementation 1, implementation 2, or implementation 3.

Further, the method shown in FIG. 5 may further include the following operations.

Operation 503. The terminal device reports the channel quality information of the M segments of frequency domain resources to the network device.

Specifically, after determining the channel quality information of each of the five combinations, the terminal device may select a combination with best channel quality from the five combinations, and report channel quality information of the combination to the network device. Alternatively, the terminal device may report the channel quality information of each of the five combinations to the network device.

That the terminal device reports the channel quality information of each of the five combinations to the network device is used as an example. The terminal device may report an identifier of each combination and the corresponding channel quality information to the network device. An identifier of a combination may be information that can be used to identify the combination. For example, six bits may be used to identify each of the 45 combinations. The network device and the terminal device may pre-agree on a manner of identifying a combination by using bits.

For example, the channel quality information is the transmission efficiency, and Table 3 shows an example of the identifiers of the five combinations and the corresponding channel quality information.

TABLE 3

Example of the identifiers of the five combinations and the corresponding channel quality information

| Identifier of each combination | Corresponding channel quality information (expressed in a form of a differential value) |
| --- | --- |
| 000000 (represents the combination 1) | 1 |
| 000100 (represents the combination 2) | 0 |
| 000101 (represents the combination 3) | 2 |
| 001101 (represents the combination 4) | 3 |
| 011001 (represents the combination 5) | 2 |

In some embodiments, the terminal device may further report indication information for W and/or indication information for M to the network device.

Specifically, if both the values of W and M are independently determined by the terminal device, the terminal device may report the indication information for W and the indication information for M to the network device. In this way, the network device may determine, according to a division rule pre-agreed on by the network device and the terminal device (or a division rule preconfigured in a protocol), that the frequency domain resource used by the terminal device is divided into the W segments of frequency domain resources, a bandwidth value of each segment of frequency domain resource, and that each combination includes M segments of frequency domain resources.

If the value of W is independently determined by the terminal device, and the value of M is preconfigured in the protocol or is determined by the terminal device based on the received indication information that is for M and that is sent by the network device, the terminal device may report, to the network device, indication information for W. In this way, the network device may determine, according to a division rule pre-agreed on by the network device and the terminal device (or a division rule preconfigured in a protocol), that the frequency domain resource used by the terminal device is divided into the W segments of frequency domain resources and a bandwidth value of each segment of frequency domain resource. Because the value of M is configured by the network device and sent to the terminal device or is preconfigured in the protocol, the network device may directly obtain the value of M, and determine that each combination includes M segments of frequency domain resources.

If the value of M is independently determined by the terminal device, and the value of W is preconfigured in the protocol or is determined by the terminal device based on the received indication information that is for W and that is sent by the network device, the terminal device may report, to the network device, indication information for M. In this way, because the value of W is configured by the network device and sent to the terminal device or is preconfigured in the protocol, the network device may directly obtain the value of W; determine that the frequency domain resource used by the terminal device is divided into the W segments of frequency domain resources and a bandwidth value of each segment of frequency domain resource; and further determine, based on the indication information that is for M and that is reported by the terminal device, that each combination includes M segments of frequency domain resources.

In conclusion, because the network device and the terminal device may pre-agree on a manner of identifying each combination, the network device may determine that 000000 represents the combination 1, 000100 represents the combination 2, . . . , and 011001 represents the combination 5; and may determine the frequency domain resources included in each combination, for example, determine that the combination 1 includes the frequency domain resource c1 and the frequency domain resource c2. After obtaining the channel quality information of each of the five combinations, the network device may determine, based on the channel quality information of each combination, a combination used to send a data packet.

It should be noted that, if the network device determines that the combination used to send the data packet is the combination 1 (the frequency domain resource c1 and the frequency domain resource c2), the network device may split a bit sequence included in the data packet into a bit sequence 1 and a bit sequence 2; encode and modulate the bit sequence 1, and map a result obtained after the modulation to an RE of the frequency domain resource c1 in the time domain resource range; and encode and modulate the bit sequence 2, and map a result obtained after the modulation to an RE of the frequency domain resource c2 in the time domain resource range (where this manner is referred to as a manner 1 for short for ease of description). Alternatively, the network device may encode and modulate an entire bit sequence included in the data packet, and map a result obtained after the modulation to REs in the frequency domain resource c1 and the frequency domain resource c2 (where this manner is referred to as a manner 2 for short for ease of description). Considering that in operation 603, the channel quality information that is of each combination and that is determined by the terminal device is the channel quality information that corresponds to the combination and that is obtained by mapping, to the M segments of frequency domain resources, the data packet that has been encoded and modulated, the network device may send the data packet in the manner 2 after determining the combination used to send the data packet.

In the foregoing manner, the terminal device determines the channel quality information of the M segments of frequency domain resources in the W segments of frequency domain resources of the terminal device based on the TBS, to ensure that the total estimated data volume of the M segments of frequency domain resources in the time domain resource range meets the TBS requirement, so that after the terminal device reports the channel quality information of the M segments of frequency domain resources to the network device, the network device can properly determine the frequency domain resource used to transmit the data packet, thereby improving efficiency of transmitting the data packet.

Figure 7:
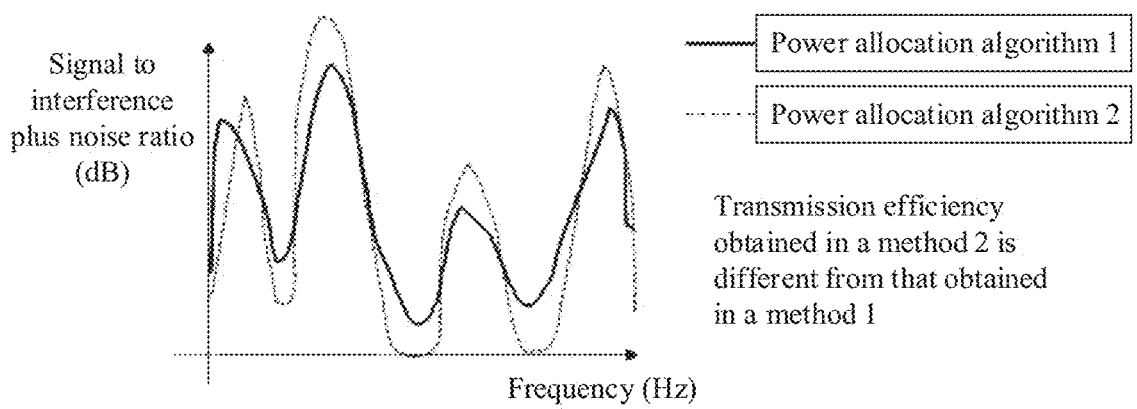
FIG. 7 is an example schematic diagram of a relationship between a power allocation algorithm and a signal to interference plus noise ratio, according to some embodiments of the disclosure.

For embodiment(s) of Group 1 and/or embodiment(s) of Group 2, a power allocation algorithm used when the network device sends the data packet may affects a signal to interference plus noise ratio of a channel, and/or affect the efficiency of transmitting the data packet. For example, for a same channel, if the network device sends the data packet by using a power allocation algorithm 1, transmission efficiency corresponding to the power allocation algorithm 1 is v1; if the network device sends the data packet by using a power allocation algorithm 2, transmission efficiency corresponding to the power allocation algorithm 2 is v2 (where v2 is not equal to v1), as shown in FIG. 7.

Based on this, in some embodiments, the network device may indicate, to the terminal device, a first power allocation algorithm used to determine the channel quality information. There may be a plurality of specific indication manners, and this is not limited herein. The first power allocation algorithm may be the power allocation algorithm used by the network device, or a power allocation algorithm selected by the network device from power allocation algorithms reported by the terminal device. Correspondingly, the terminal device receives the first power allocation algorithm indicated by the network device, and determines the channel quality information of the frequency domain resource based on the power allocation algorithm. In some embodiments, the terminal device determines the channel quality information of the frequency domain resource based on a second power allocation algorithm, and indicates the second power allocation algorithm to the network device. There may be a plurality of specific indication manners, and this is not limited herein. Correspondingly, after receiving the second power allocation algorithm indicated by the terminal device, the network device sends the data packet on the corresponding frequency domain resource by using the second power allocation algorithm.

In some embodiments, the first power allocation algorithm and the second power allocation algorithm may be understood as performing power allocation according to an allocation rule. In some embodiments, the allocation rule may be allocating a power in a specific manner, for example, allocating a power based on a water filling algorithm. The following uses an example to describe how the network device allocates the power by using the water filling algorithm. The network device receives channel quality information that is of three segments of frequency domain resources (a frequency domain resource f1, a frequency domain resource f2, and a frequency domain resource f3) of the terminal device and that is reported by the terminal device. The channel quality information of the frequency domain resource f1, the frequency domain resource f2, and the frequency domain resource f3 may be sequentially represented as 5, 2, and 0. Assuming that a power of the network device (namely, a transmit power of the network device, or referred to as a transmit power) is 30 W, and a maximum power that can be allocated to each segment of frequency domain resource is 20 W, a power allocation result obtained by the network device based on the water filling algorithm is: the frequency domain resource f1 (20 W), the frequency domain resource f2 (10 W), and the frequency domain resource f3 (0 W).

This implementation is used as an example. The network device and the terminal device may pre-agree on the allocation rule (for example, allocating the power based on the water filling algorithm), or the allocation rule is preconfigured in a protocol. When the network device indicates, to the terminal device, the first power allocation algorithm used to determine the channel quality information, content specifically indicated by the network device may be a maximum power on each segment of frequency domain resource. Alternatively, when the terminal device indicates the second power allocation algorithm to the network device, content specifically indicated by the terminal device may also be a maximum power in each segment of frequency domain resource.

The following specifically describes how the terminal device determines the channel quality information based on the first power allocation algorithm indicated by the network device. For example, the frequency domain resource used by the terminal device is divided into three segments of frequency domain resources, namely, a frequency domain resource d1, a frequency domain resource d2, and a frequency domain resource d3. The terminal device obtains channel quality (which may be a signal to interference plus noise ratio) of the three segments of frequency domain resources of the terminal device based on the reference signal. The channel quality of the frequency domain resource d1, the frequency domain resource d2, and the frequency domain resource d3 may be sequentially represented as 3, 2, and 1 (where a larger value indicates better channel quality). The terminal device determines, based on the first power allocation algorithm (for example, that the maximum power on each segment of frequency domain resource is 20 W) indicated by the network device and the power of the network device (where it is assumed that the power of the network device is 30 W), that powers allocated to the frequency domain resource d1, the frequency domain resource d2, and the frequency domain resource d3 are respectively the frequency domain resource d1 (20 W), the frequency domain resource d2 (10 W), and the frequency domain resource d3 (0 W). The terminal device adjusts the channel quality of the frequency domain resource d1, the frequency domain resource d2, and the frequency domain resource d3 based on the power allocation algorithm, for example, adjusts the channel quality to 8, 1, and 0 (where the values are merely used as an example for description), and then obtains channel quality information of each of the three segments of frequency domain resources based on the adjusted channel quality.

It should be noted that the foregoing example describes only a case in which power allocation is performed in a unit of one segment of frequency domain resource. In some embodiments, power allocation may alternatively be performed in a unit of a frequency domain resource combination (where the frequency domain resource combination may include a plurality of segments of frequency domain resources). This is not specifically limited.

In the foregoing manner, the power allocation algorithm used by the network device is fully considered when the terminal device determines the channel quality information, to ensure consistency between the channel quality information determined by the terminal device and channel quality information that is when the network device transmits the data packet.

In some embodiments, the network device may further send third indication information to the terminal device. The third indication information is used to indicate the terminal device to determine the channel quality information in the manner in embodiment(s) of Group 1 and/or embodiment(s) of Group 2. A specific indication manner is not limited. For example, the third indication information may be represented by using one bit. For example, if the bit is "0", the terminal device is indicated to determine the channel quality information in the manner in embodiment(s) of Group 1; if the bit is "1", the terminal device is indicated to determine the channel quality information in the manner in embodiment(s) of Group 2. Alternatively, the network device and the terminal device may pre-agree that the channel quality information is to be determined in the manner in embodiment(s) of Group 1 and/or embodiment(s) of Group 2. This is not specifically limited.

The following describes, separately with reference to embodiment(s) of Group 3 and embodiment(s) of Group 4, a possible interaction case in an overall procedure for determining the channel quality information.

Illustrative Embodiments(s): Group 3

Figure 8:
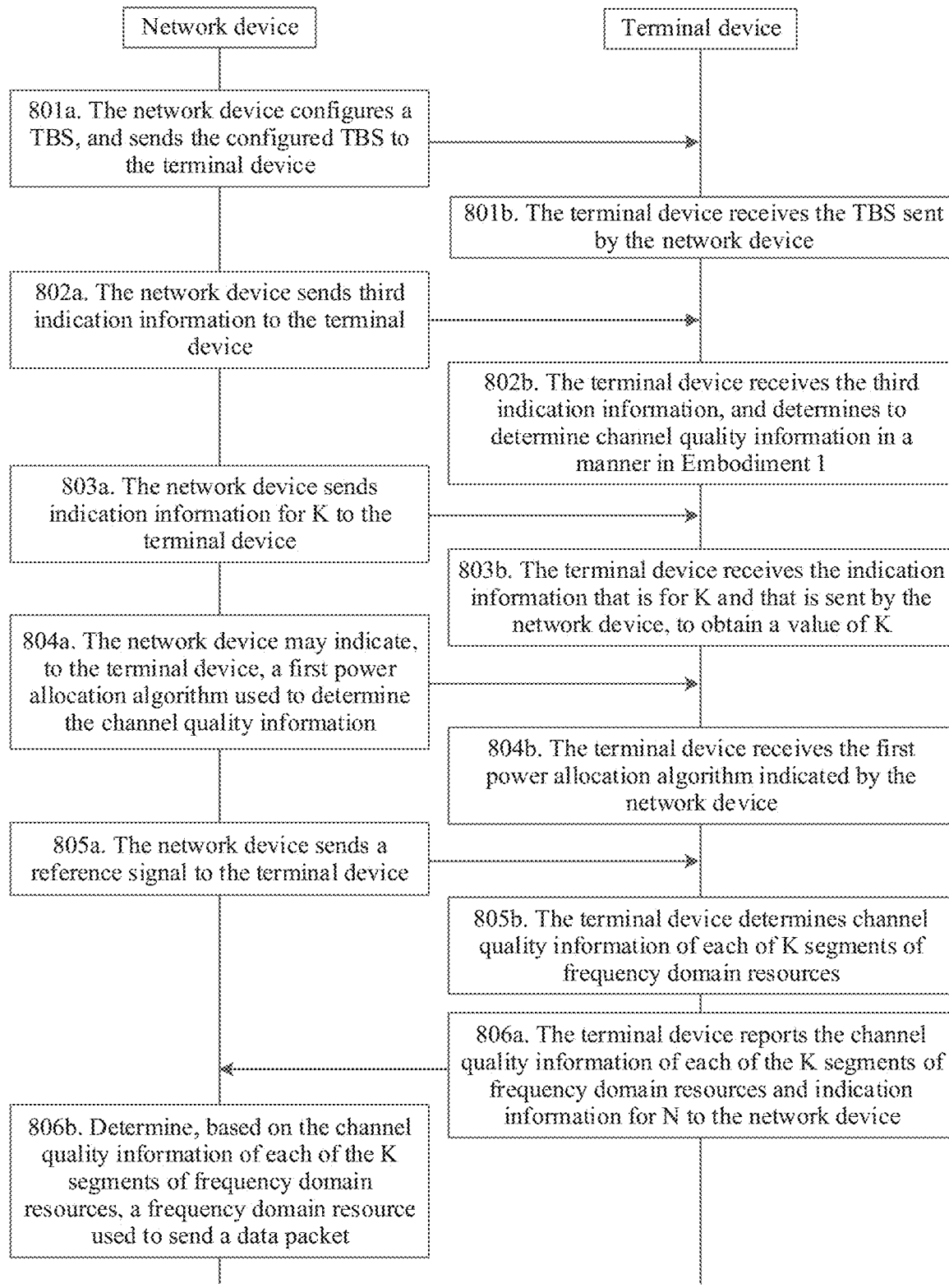
FIG. 8 is an example schematic flowchart corresponding to a channel quality information determining method, according to some embodiments of the disclosure.

FIG. 8 is a schematic flowchart corresponding to a channel quality information determining method according to embodiment(s) of Group 3 of this application. As shown in FIG. 8, the method includes the following operations.

Operation 801*a*. A network device configures a TBS, and sends the configured TBS to a terminal device.

Specifically, the network device may send the TBS to the terminal device in a plurality of manners. For example, the TBS or information used to indicate the TBS is carried in signaling (or a message). A specific indication manner is not limited. In an example, the network device may send the TBS to the terminal device in a unicast manner. For example, the network device may send the TBS to the terminal device by using semi-static signaling or dynamic signaling. The semi-static signaling may be specifically radio resource control (radio resource control, RRC) signaling, and the dynamic signaling may be specifically physical layer signaling, for example, downlink control information (downlink control information, DCI). In another example, the network device may send the TBS to the terminal device in a multicast (including multicast and broadcast) manner. For example, the network device may send the TBS to the terminal device by using a groupcast/multicast message.

Operation 801b. The terminal device receives the TBS sent by the network device.

Operation 802a. The network device sends third indication information to the terminal device, where the third indication information is used to indicate the terminal device to determine channel quality information in the manner in embodiment(s) of Group 1.

Operation 802b. The terminal device receives the third indication information, and determines to determine the channel quality information in the manner in embodiment(s) of Group 1.

Operation 803a. The network device sends indication information for K (referred to as indication information k for short for ease of description) to the terminal device, where the indication information k is used to indicate a value of K. A specific indication manner is not limited.

In some embodiments, the network device may send the indication information k to the terminal device by using signaling (or a message). This is not specifically limited.

It may be understood that the TBS (or the information used to indicate the TBS) and the indication information k may be sent by using same signaling. For example, the network device sends RRC signaling to the terminal device, where the RRC signaling includes both the TBS (or the information used to indicate the TBS) and the indication information k. Alternatively, the TBS (or the information used to indicate the TBS) and the indication information k may be sent by using different signaling. This is not specifically limited.

Operation 803b. The terminal device receives the indication information that is for K and that is sent by the network device, to obtain the value of K.

Operation 804a. The network device may indicate, to the terminal device, a first power allocation algorithm used to determine the channel quality information.

Operation 804b. The terminal device receives the first power allocation algorithm indicated by the network device.

Operation 805a. The network device sends a reference signal to the terminal device.

Operation 805b. After receiving the reference signal sent by the network device, the terminal device determines channel quality information of each of K segments of frequency domain resources in N segments of frequency domain resources of the terminal device based on the TBS, a time domain resource range, the reference signal, and the first power allocation algorithm.

Operation 806a. The terminal device reports the channel quality information of each of the K segments of frequency domain resources and indication information for N to the network device.

Operation 806b. The network device receives the channel quality information of each of the K segments of frequency domain resources and the indication information for N that are reported by the terminal device, and determines, based on the channel quality information of each of the K segments of frequency domain resources, a frequency domain resource used to send a data packet, to subsequently send the data packet to the terminal device on the frequency domain resource.

Illustrative Embodiment(s): Group 4

Figure 9:
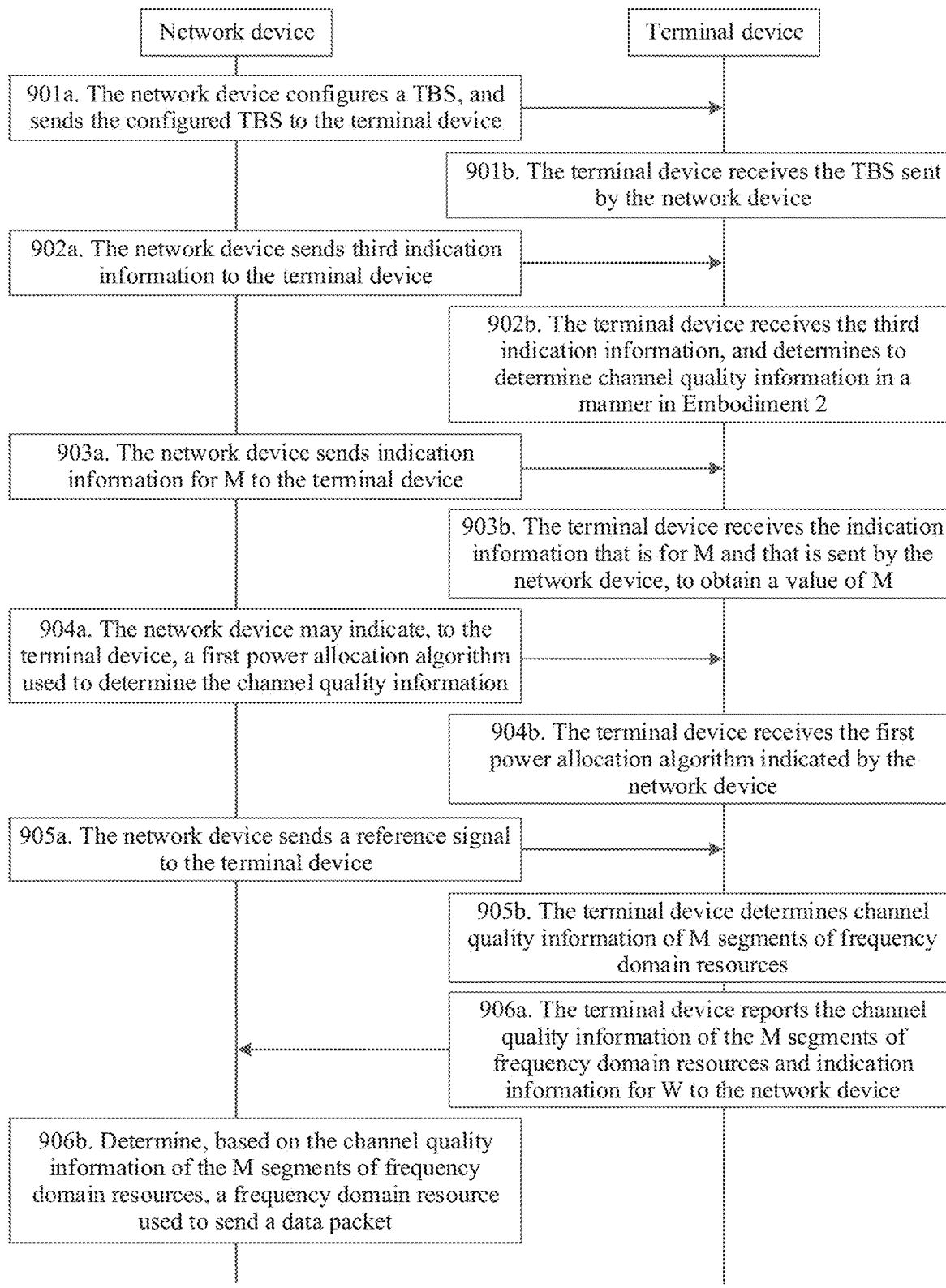
FIG. 9 is an example schematic flowchart corresponding to a channel quality information determining method, according to some embodiments of the disclosure.

FIG. 9 is a schematic flowchart corresponding to a channel quality information determining method, according to some embodiments of the disclosure. As shown in FIG. 9, the method 900 may include one or more of the following operations.

Operation 901a. A network device configures a TBS, and sends the configured TBS to a terminal device.

Operation 901b. The terminal device receives the TBS sent by the network device.

Operation 902a. The network device sends third indication information to the terminal device, where the third indication information is used to indicate the terminal device to determine channel quality information in the manner in embodiment(s) of Group 2.

Operation 902b. The terminal device receives the third indication information, and determines to determine the channel quality information in the manner in embodiment(s) of Group 2.

Operation 903a. The network device sends indication information for M (referred to as indication information m for short for ease of description) to the terminal device, where the indication information m is used to indicate a value of M. A specific indication manner is not limited.

In some embodiments, the network device may send the indication information m to the terminal device by using signaling (or a message). This is not specifically limited.

It may be understood that the TBS (or information used to indicate the TBS) and the indication information m may be sent by using same signaling. For example, the network device sends RRC signaling to the terminal device, where the RRC signaling includes both the TBS (or the information used to indicate the TBS) and the indication information m. Alternatively, the TBS (or information used to indicate the TBS) and the indication information m may be sent by using different signaling. This is not specifically limited.

Operation 903b. The terminal device receives the indication information that is for M and that is sent by the network device, to obtain the value of M.

Operation 904a. The network device may indicate, to the terminal device, a first power allocation algorithm used to determine the channel quality information.

Operation 904b. The terminal device receives the first power allocation algorithm indicated by the network device.

Operation 905a. The network device sends a reference signal to the terminal device.

Operation 905b. After receiving the reference signal sent by the network device, the terminal device determines channel quality information of M segments of frequency domain resources in W segments of frequency domain resources of the terminal based on the TBS, a time domain resource range, the reference signal, and the first power allocation algorithm.

Operation 906*a*. The terminal device reports the channel quality information of the M segments of frequency domain resources and indication information for W to the network device.

Operation 906*b*. The network device receives the channel quality information of the M segments of frequency domain resources and the indication information for W that are reported by the terminal device, and determines, based on the channel quality information of the M segments of frequency domain resources, a frequency domain resource used to send a data packet.

It should be noted: (1) Embodiment(s) of Group 3 may be a possible interaction case, in an overall procedure, corresponding to embodiment(s) of Group 1; Embodiment(s) of Group 4 may be a possible interaction case, in an overall procedure, corresponding to embodiment(s) of Group 2. A difference between embodiment(s) of Group 1 and embodiment(s) of Group 2 may be, for example, in embodiment(s) of Group 1, the terminal device determines the channel quality information of each of the K segments of frequency domain resources; embodiment(s) of Group 2, the terminal device determines the channel quality information of the M segments of frequency domain resources. However, in both the two embodiments, the TBS may be used as an input for calculating the channel quality information, so that the channel quality information determined by the terminal device meets a transmission requirement. Therefore, for content other than the difference, mutual reference may be made between the foregoing embodiments. (2) Operation numbers in the embodiments of this application are merely possible examples of procedure execution, and do not constitute a limitation on execution sequences of the operations. In some embodiments, there is no strict execution sequence between operations that do not have a time sequence dependency relationship with each other. For example, operation 801*a*, operation 802*a*, and/or operation 803*a* may be simultaneously performed, or operation 802*a* may be performed before operation 801*a* and/or operation 803*a*. This is not specifically limited.

The foregoing describes, mainly from the perspective of interaction between the network device and the terminal device, the solutions provided in this application. It may be understood that, to implement the foregoing functions, the network device or the terminal device may include a corresponding hardware structure and/or a software module for performing each function. A person skilled in the art should be easily aware that, in combination with the examples described in the embodiments disclosed in this specification, units and algorithm operations may be implemented by hardware or a combination of hardware and computer software in the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 10:
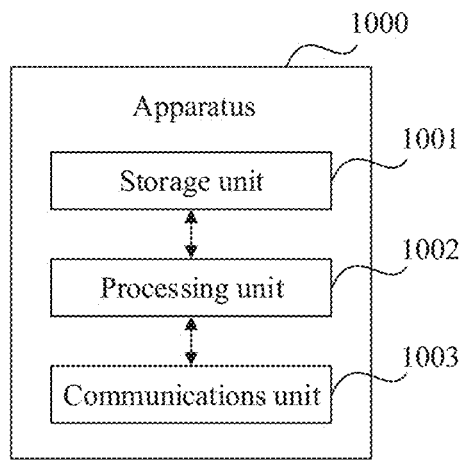
FIG. 10 is an example block diagram of an apparatus, according to some embodiments of the disclosure.

When an integrated unit is used, FIG. 10 is an example block diagram of an apparatus 1000, according to some embodiments of the disclosure. The apparatus 1000 may exist in a form of software. The apparatus 1000 may include a processing unit 1002 and a communications unit 1003. The processing unit 1002 is configured to control and manage an action of the apparatus 1000. The communications unit 1003 is configured to support the apparatus 1000 in communicating with another network entity. The apparatus 1000 may further include a storage unit 1001, configured to store program code and data that are of the apparatus 1000.

The processing unit 1002 may be a processor or a controller, for example, may be a general-purpose central processing unit (central processing unit, CPU), a general-purpose processor, a digital signal processor (digital signal processing, DSP), an application-specific integrated circuit (application specific integrated circuits, ASIC), a field programmable gate array (field programmable gate array, FPGA) or another programmable logic device, a transistor logic device, a hardware component, or any combination thereof. The processing unit 1002 may implement or execute various examples of logical blocks, modules, and circuits described with reference to content disclosed in the present disclosure. The processor may alternatively be a combination implementing a computing function, for example, a combination including one or more microprocessors, or a combination of a DSP and a microprocessor. The communications unit 1003 may be a communications interface, a transceiver, a transceiver circuit, or the like, where the communications interface is a general name, and may include a plurality of interfaces in a specific implementation. The storage unit 1001 may be a memory.

The apparatus 1000 may be the terminal device in any one of the foregoing embodiments, or may be a semiconductor chip disposed in the terminal device. The processing unit 1002 may support the apparatus 1000 in performing the actions of the terminal device in the foregoing method examples, and the communications unit 1003 may support communication between the apparatus 1000 and a network device.

Specifically, in an embodiment, the processing unit is configured to:

obtain a configured transport block size TBS, and determine channel quality information of each of K segments of frequency domain resources in N segments of frequency domain resources of the terminal device based on the TBS and a time domain resource range, where both N and K are integers greater than or equal to 1, and K is less than or equal to N.

In some embodiments, the processing unit is specifically configured to: determine, based on the TBS and the time domain resource range, that an estimated data volume of each of the K segments of frequency domain resources in the time domain resource range meets a TBS requirement; and determine the channel quality information of each of the K segments of frequency domain resources.

In some embodiments, the processing unit is further configured to determine channel quality information of a segment of frequency domain resource other than the K segments of frequency domain resources in the N segments of frequency domain resources.

The communications unit is configured to report the channel quality information of each of the N segments of frequency domain resources to the network device.

In some embodiments, the communications unit is configured to report the channel quality information of each of the K segments of frequency domain resources to the network device.

In some embodiments, the communications unit is configured to report channel quality information of each of P segments of frequency domain resources in the K segments of frequency domain resources to the network device, where P is an integer greater than or equal to 1 and less than K.

In some embodiments, the P segments of frequency domain resources are P segments of frequency domain resources that are in the K segments of frequency domain resources and whose estimated data volumes are the largest in the time domain resource range.

In some embodiments, the communications unit is configured to report indication information for N to the network device.

In some embodiments, the communications unit is configured to receive indication information for K from the network device.

In some embodiments, the processing unit is further configured to determine, based on the TBS and the time domain resource range, that the K segments of frequency domain resources do not exist in the N segments of frequency domain resources of the terminal device, where an estimated data volume of each of the K segments of frequency domain resources in the time domain resource range meets a TBS requirement. The communications unit is configured to report first indication information or channel quality information of S segments of frequency domain resources to the network device, where the first indication information is used to indicate that a frequency domain resource used by the terminal device does not meet the TBS requirement, and the S segments of frequency domain resources are S segments of frequency domain resources that are in the N segments of frequency domain resources used by the terminal device and whose estimated data volumes are the largest in the time domain resource range, where S is an integer greater than or equal to 1, and S is less than or equal to N.

In another embodiment, the processing unit is configured to:
obtain a configured transport block size TBS, and determine channel quality information of M segments of frequency domain resources in W segments of frequency domain resources of the terminal device based on the TBS and a time domain resource range, where both W and M are integers greater than or equal to 1, and M is less than or equal to W.

In some embodiments, the processing unit is configured to:
determine, in the W segments of frequency domain resources of the terminal device based on the TBS and the time domain resource range, that a total estimated data volume of the M segments of frequency domain resources in the time domain resource range meets a TBS requirement; and determine the channel quality information of the M segments of frequency domain resources.

In some embodiments, the communications unit is configured to report the channel quality information of the M segments of frequency domain resources to the network device.

In some embodiments, the communications unit is configured to report indication information for W and/or M to the network device.

In some embodiments, the processing unit is further configured to determine, based on the TBS and the time domain resource range, that the M segments of frequency domain resources do not exist in the W segments of frequency domain resources of the terminal device, where a total estimated data volume of the M segments of frequency domain resources meets a TBS requirement. The communications unit is configured to report second indication information or channel quality information of T segments of frequency domain resources to the network device, where the second indication information is used to indicate that a frequency domain resource used by the terminal device does not meet the TBS requirement, and the T segments of frequency domain resources are T segments of frequency domain resources that are in the W segments of frequency domain resources used by the terminal device and whose total estimated data volume is the largest in the time domain resource range, where T is an integer greater than or equal to 1, and T is less than or equal to W.

In some embodiments, the communications unit is configured to receive a power allocation algorithm that is indicated by the network device and that is used to determine the channel quality information, where the power allocation algorithm is a power allocation algorithm used by the network device, or a power allocation algorithm selected by the network device from power allocation algorithms reported by the terminal device.

The apparatus 1000 may alternatively be the network device in any one of the foregoing embodiments, or may be a semiconductor chip disposed in the network device. The processing unit 1002 may support the apparatus 1000 in performing the actions of the network device in the foregoing method examples, and the communications unit 1003 may support communication between the apparatus 1000 and a terminal device.

Specifically, in an embodiment, the processing unit is configured to configure a transport block size TBS.

The communications unit is configured to send the TBS to the terminal device, where the TBS is used to determine channel quality information of a frequency domain resource of the terminal device.

In some embodiments, that the TBS is used to determine channel quality information of a frequency domain resource of the terminal device includes: the TBS is used to determine channel quality information of each of K segments of frequency domain resources in N segments of frequency domain resources of the terminal device, where both N and K are integers greater than or equal to 1, and K is less than or equal to N.

In some embodiments, the communications unit is configured to: receive channel quality information that is of each of the N segments of frequency domain resources and that is sent by the terminal device, or receive the channel quality information that is of each of the K segments of frequency domain resources and that is sent by the terminal device, or receive channel quality information that is of each of P segments of frequency domain resources in the K segments of frequency domain resources and that is sent by the terminal device, where P is an integer greater than or equal to 1 and less than K.

In some embodiments, the P segments of frequency domain resources are P segments of frequency domain resources, in the K segments of frequency domain resources, whose estimated data volumes are the largest in the time domain resource range.

In some embodiments, the communications unit is configured to receive indication information that is for N and that is reported by the terminal device.

In some embodiments, the communications unit is configured to send indication information for K to the terminal device.

In some embodiments, that the TBS is used to determine channel quality information of a frequency domain resource of the terminal device includes:
the TBS is used to determine channel quality information of M segments of frequency domain resources in W segments of frequency domain resources of the terminal device, where both W and M are integers greater than or equal to 1, and M is less than or equal to W.

In some embodiments, the communications unit is configured to receive the channel quality information that is of the M segments of frequency domain resources and that is sent by the terminal device.

In some embodiments, the communications unit is configured to receive indication information that is for W and/or M and that is reported by the terminal device.

In some embodiments, the communications unit is configured to indicate, to the terminal device, a power allocation algorithm used to determine the channel quality information, where the power allocation algorithm is a power allocation algorithm used by the network device, or a power allocation algorithm selected by the network device from power allocation algorithms reported by the terminal device.

Figure 11:
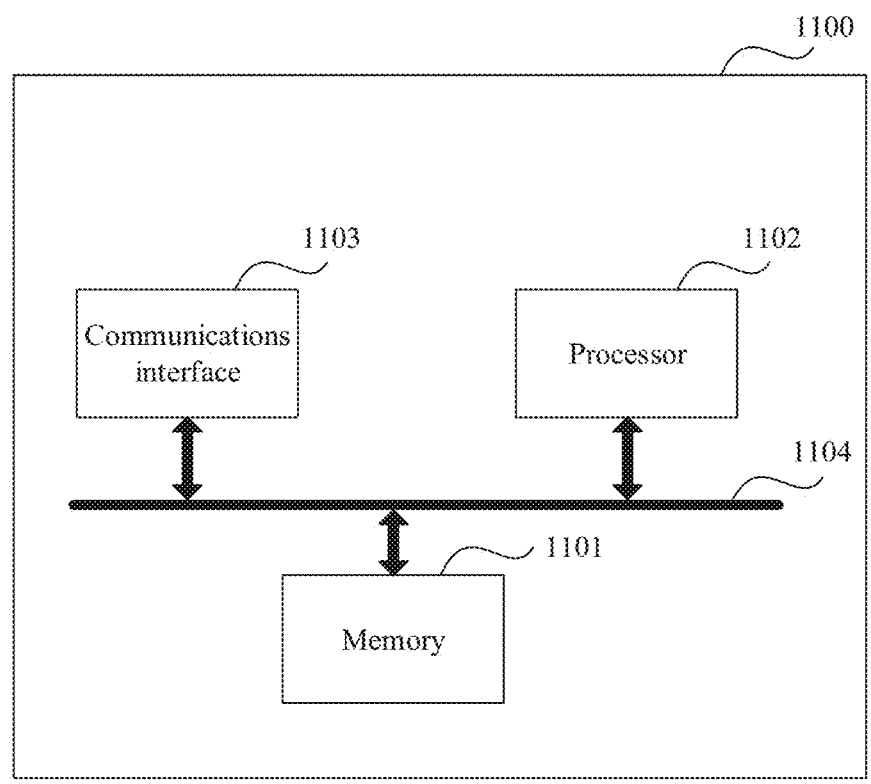
FIG. 11 is an example schematic diagram of an apparatus, according to some embodiments of the disclosure.

FIG. 11 is a schematic diagram of an apparatus according to this application. The apparatus may be the terminal device or the network device in the foregoing embodiments. The apparatus 1100 includes a processor 1102, a communications interface 1103, and a memory 1101. Optionally, the apparatus 1100 may further include a communications line 1104 (e.g., a bus). The communications interface 1103, the processor 1102, and the memory 1101 may be connected to each other through the communications line 1104. The communications line 1104 may be a peripheral component interconnect (peripheral component interconnect, PCI for short) bus, an extended industry standard architecture (extended industry standard architecture, EISA for short) bus, or the like. The communications line 1104 may be classified into an address bus, a data bus, a control bus, and the like. For ease of representation, only one thick line is used to represent the communications line in FIG. 11, but this does not mean that there is only one bus or only one type of bus.

The processor 1102 may be a CPU, a microprocessor, an ASIC, or one or more integrated circuits configured to control program execution in the solutions of this application.

The communications interface 1103 is configured to communicate with another device or a communications network, such as an Ethernet, a RAN, a wireless local area network (wireless local area networks, WLAN), or a wired access network by using any apparatus such as a transceiver.

The memory 1101 may be a read-only memory (read-only memory, ROM) or another type of static storage device that can store static information and instructions, or a random access memory (random access memory, RAM) or another type of dynamic storage device that can store information and instructions; or may be an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 1101 is not limited thereto. The memory may exist independently, and is connected to the processor through the communications line 1104. Alternatively, the memory may be integrated with the processor.

The memory 1101 is configured to store a computer-executable instruction for executing the solutions of this application, and the processor 1102 controls the execution. The processor 1102 is configured to execute the computer-executable instruction stored in the memory 1101, to implement the session handling method provided in the foregoing embodiments of this application.

Optionally, the computer-execution instruction in some embodiments may also be referred to as an application program code. This is not specifically limited in this embodiment of this application.

In some embodiments, some or all of the features, components, and/or operations of one or more of the embodiments of one or more of the Groups (e.g., Group 1, Group 2, Group 3, or Group 4), as discussed herein, may be combined with some or all of the features, components, and/or operations of one or more embodiments of any of the other Groups.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable media may be a magnetic medium (for example, a floppy disk, a hard disk, or a magnetic tape), an optical medium (for example, a DVD), a semiconductor medium (for example, a solid-state drive (Solid State Disk, SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Operations of the methods or algorithms described in the embodiments of this application may be directly embedded into hardware, a software unit executed by a processor, or a combination thereof. The software unit may be stored in a RAM, a flash memory, a ROM, an EPROM, an EEPROM, a register, a hard disk, a removable magnetic disk, a CD-ROM, or a storage medium of any other form in the art. For example, the storage medium may be connected to the processor, so that the processor may read information from the storage medium and write information to the storage medium. Optionally, the storage medium may alternatively be integrated into the processor. The processor and the storage medium may be disposed in an ASIC, and the ASIC may be disposed in a terminal device. Optionally, the processor and the storage medium may alternatively be disposed in different components of a terminal device.

These computer program instructions may alternatively be loaded onto a computer or another programmable data processing device, so that a series of operations and/or steps are performed on the computer or the another programmable device, thereby generating computer-implemented processing. Therefore, the instructions executed on the computer or the another programmable device provide operations for implementing a specific function in one or more procedures in the flowcharts and/or in one or more blocks in the block diagrams.

Although this application is described with reference to specific features and the embodiments thereof, it is clear that various modifications and combinations may be made to them without departing from the spirit and scope of this application. Correspondingly, this specification and the accompanying drawings are merely example descriptions of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. An apparatus, comprising:
one or more processors; and
a non-transitory memory coupled to the one or more processors, wherein the non-transitory memory stores a program to be executed by the one or more processors, the program comprising instructions for:
obtaining a configured transport block size (TBS);
determining channel quality information of each of K segments of frequency domain resources in N segments of frequency domain resources of a terminal device based on at least one of the configured transport block size (TBS) or a time domain resource range, wherein both N and K are integers greater than or equal to 1, and K is less than or equal to N;
determining, based on at least one of the configured transport block size (TBS) or the time domain resource range, that the K segments of frequency domain resources do not exist in the N segments of frequency domain resources of the terminal device, wherein an estimated data volume of each of the K segments of frequency domain resources in the time domain resource range meets a transport block size (TBS) requirement; and
reporting first indication information or channel quality information of S segments of frequency domain resources to a network device, wherein the first indication information is used to indicate that a frequency domain resource used by the terminal device does not meet the transport block size (TBS) requirement, and the S segments of frequency domain resources are S segments of frequency domain resources that are in the N segments of frequency domain resources used by the terminal device and whose estimated data volumes are the largest in the time domain resource range, wherein S is an integer greater than or equal to 1, and S is less than or equal to N.

2. The apparatus of claim 1, wherein the program further comprising instructions for:
determining, based on at least one of the configured transport block size (TBS) or the time domain resource range, that an estimated data volume of each of the K segments of frequency domain resources in the time domain resource range meets a transport block size (TBS) requirement; and
determining the channel quality information of each of the K segments of frequency domain resources.

3. The apparatus of claim 1, wherein the program further comprising instructions for:
reporting the channel quality information of each of the K segments of frequency domain resources to a network device.

4. The apparatus of claim 1, wherein channel quality information of each of P segments of frequency domain resources in the K segments of frequency domain resources is reported to a network device, wherein P is an integer greater than or equal to 1 and less than K.

5. The apparatus of claim 4, wherein the P segments of frequency domain resources are P segments of frequency domain resources, in the K segments of frequency domain resources, whose estimated data volumes are the largest in the time domain resource range.

6. The apparatus of claim 1, wherein the program further comprising instructions for:
reporting, by the terminal device, indication information for N to the network device.

7. A non-transitory computer readable medium, wherein the non-transitory computer readable medium stores instructions that, when executable by a computer, cause the computer to perform operations comprising:
obtaining a configured transport block size (TBS);
determining channel quality information of each of K segments of frequency domain resources in N segments of frequency domain resources of a terminal device based on at least one of the configured transport block size (TBS) or a time domain resource range, wherein both N and K are integers greater than or equal to 1, and K is less than or equal to N;
determining, based on the configured transport block size (TBS) and the time domain resource range, that the K segments of frequency domain resources do not exist in the N segments of frequency domain resources of the terminal device, wherein an estimated data volume of each of the K segments of frequency domain resources in the time domain resource range meets a transport block size (TBS) requirement; and
reporting first indication information or channel quality information of S segments of frequency domain resources to a network device, wherein the first indication information is used to indicate that a frequency domain resource used by the terminal device does not meet the transport block size (TBS) requirement, and the S segments of frequency domain resources are S segments of frequency domain resources that are in the N segments of frequency domain resources used by the terminal device and whose estimated data volumes are the largest in the time domain resource range, wherein S is an integer greater than or equal to 1, and S is less than or equal to N.

8. The non-transitory computer readable medium of claim 7, wherein the instructions further cause the computer to perform operations comprising:
  determining, based on at least one of the configured transport block size (TBS) or the time domain resource range, that an estimated data volume of each of the K segments of frequency domain resources in the time domain resource range meets a transport block size (TBS) requirement; and
  determining the channel quality information of each of the K segments of frequency domain resources.

9. The non-transitory computer readable medium of claim 7, wherein the instructions further cause the computer to perform operations comprising:
  determining channel quality information of a segment of frequency domain resource other than the K segments of frequency domain resources in the N segments of frequency domain resources; and
  reporting the channel quality information of each of the N segments of frequency domain resources to a network device.

10. The non-transitory computer readable medium of claim 7, wherein the instructions further cause the computer to perform operations comprising:
  reporting the channel quality information of each of the K segments of frequency domain resources to a network device.

11. The non-transitory computer readable medium of claim 7, wherein channel quality information of each of P segments of frequency domain resources in the K segments of frequency domain resources is reported to a network device, wherein P is an integer greater than or equal to 1 and less than K.

12. A method, comprising:
  obtaining a configured transport block size (TBS);
  determining channel quality information of each of K segments of frequency domain resources in N segments of frequency domain resources of a terminal device based on at least one of the configured transport block size (TBS) or a time domain resource range, wherein both N and K are integers greater than or equal to 1, and K is less than or equal to N;
  determining, based on the configured transport block size (TBS) and the time domain resource range, that the K segments of frequency domain resources do not exist in the N segments of frequency domain resources of the terminal device, wherein an estimated data volume of each of the K segments of frequency domain resources in the time domain resource range meets a transport block size (TBS) requirement; and
  reporting first indication information or channel quality information of S segments of frequency domain resources to a network device, wherein the first indication information is used to indicate that a frequency domain resource used by the terminal device does not meet the transport block size (TBS) requirement, and the S segments of frequency domain resources are S segments of frequency domain resources that are in the N segments of frequency domain resources used by the terminal device and whose estimated data volumes are the largest in the time domain resource range, wherein S is an integer greater than or equal to 1, and S is less than or equal to N.

13. The method of claim 12, further comprising:
  determining, based on at least one of the configured transport block size (TBS) or the time domain resource range, that an estimated data volume of each of the K segments of frequency domain resources in the time domain resource range meets a transport block size (TBS) requirement; and
  determining the channel quality information of each of the K segments of frequency domain resources.

14. The method of claim 12, further comprising:
  determining channel quality information of a segment of frequency domain resource other than the K segments of frequency domain resources in the N segments of frequency domain resources; and
  reporting the channel quality information of each of the N segments of frequency domain resources to a network device.

15. The method of claim 12, further comprising:
  reporting the channel quality information of each of the K segments of frequency domain resources to a network device.

16. The method of claim 12, wherein channel quality information of each of P segments of frequency domain resources in the K segments of frequency domain resources is reported to a network device, wherein P is an integer greater than or equal to 1 and less than K.

17. The method of claim 16, wherein the P segments of frequency domain resources are P segments of frequency domain resources, in the K segments of frequency domain resources, whose estimated data volumes are the largest in the time domain resource range.

18. The method of claim 12, further comprising:
  reporting indication information for N to the network device.

* * * * *